(12) United States Patent
Horii et al.

(10) Patent No.: US 10,697,989 B2
(45) Date of Patent: Jun. 30, 2020

(54) LIQUID-SEALED CARTRIDGE, SPECIMEN ANALYZER, AND SPECIMEN ANALYSIS METHOD

(71) Applicants: SYSMEX CORPORATION, Kobe-shi, Hyogo (JP); ASTI CORPORATION, Hamamatsu-shi, Shizuoka (JP)

(72) Inventors: Kazuyoshi Horii, Kobe (JP); Takao Fujiwara, Kobe (JP); Noriyuki Ogai, Kobe (JP); Kenpei Onozuka, Hamamatsu (JP); Yasuhiro Toda, Hamamatsu (JP)

(73) Assignees: SYSMEX CORPORATION, Hyogo (JP); ASTI CORPORATION, Shizuoka (JP)

( * ) Notice: Subject to any disclaimer, the term of this patent is extended or adjusted under 35 U.S.C. 154(b) by 301 days.

(21) Appl. No.: 15/796,224

(22) Filed: Oct. 27, 2017

(65) Prior Publication Data

US 2018/0120338 A1 May 3, 2018

Related U.S. Application Data

(63) Continuation of application No. PCT/JP2016/063150, filed on Apr. 27, 2016.

(30) Foreign Application Priority Data

Apr. 30, 2015 (JP) ................... 2015-093575

(51) Int. Cl.
*G01N 35/02* (2006.01)
*B65D 83/00* (2006.01)
(Continued)

(52) U.S. Cl.
CPC ........ *G01N 35/02* (2013.01); *B01L 3/502738* (2013.01); *B65D 83/00* (2013.01);
(Continued)

(58) Field of Classification Search
CPC ........ G01N 35/02; G01N 35/08; G01N 37/00; B01L 3/502738; B01L 2200/16;
(Continued)

(56) References Cited

U.S. PATENT DOCUMENTS

2005/0093087 A1   5/2005   Kadel et al.
2006/0245972 A1 * 11/2006  Osone ............... B01L 3/502707
                                              422/64
(Continued)

FOREIGN PATENT DOCUMENTS

CN   100467128 C   3/2009
CN   102047124 A   5/2011
(Continued)

OTHER PUBLICATIONS

The Chinese Office Action dated Jul. 2, 2019 in a counterpart Chinese patent application No. 201680024673.8.

(Continued)

*Primary Examiner* — Dennis White
(74) *Attorney, Agent, or Firm* — Brinks Gilson & Lione

(57) ABSTRACT

This liquid-sealed cartridge includes: a cartridge body including a plurality of liquid storage portions; a seal body configured to seal an opening of each of the plurality of liquid storage portions; and an elastic body disposed so as to be opposed to the plurality of liquid storage portions, the elastic body being configured to form a passage adjacent to the plurality of liquid storage portions. Each of the plurality of liquid storage portions and the passage are configured to be communicated with each other by the corresponding seal body being pushed to be opened through the elastic body.

19 Claims, 22 Drawing Sheets

(51) Int. Cl.
  *G01N 37/00* (2006.01)
  *G01N 35/08* (2006.01)
  *B01L 3/00* (2006.01)
(52) U.S. Cl.
  CPC ............ *G01N 35/08* (2013.01); *G01N 37/00* (2013.01); *B01L 2200/16* (2013.01); *B01L 2300/049* (2013.01); *B01L 2300/087* (2013.01); *B01L 2300/123* (2013.01)
(58) Field of Classification Search
  CPC ......... B01L 2300/049; B01L 2300/123; B01L 2300/087; B65D 83/00
  See application file for complete search history.

(56) References Cited

U.S. PATENT DOCUMENTS

| | | | |
|---|---|---|---|
| 2006/0264779 A1 | 11/2006 | Kemp et al. | |
| 2009/0074626 A1* | 3/2009 | Kadel | F16K 99/0001 422/400 |
| 2010/0050749 A1 | 3/2010 | Yuan | |
| 2011/0030809 A1* | 2/2011 | Ying | B01L 3/50851 137/13 |
| 2011/0120580 A1* | 5/2011 | Takahashi | B01J 19/0093 137/797 |
| 2011/0186466 A1 | 8/2011 | Kurowski et al. | |
| 2013/0196442 A1 | 8/2013 | Momose et al. | |

FOREIGN PATENT DOCUMENTS

| | | |
|---|---|---|
| CN | 102150048 A | 8/2011 |
| EP | 2905079 A1 | 8/2015 |
| JP | 2005-096866 A | 4/2005 |
| JP | 2006-308366 A | 11/2006 |
| JP | 2008-544214 A | 12/2008 |
| JP | 2011-047708 A | 3/2011 |
| JP | 2011-524313 A | 9/2011 |
| JP | 2013-156063 A | 8/2013 |
| WO | WO 2014/108184 | 7/2014 |

OTHER PUBLICATIONS

The Communication pursuant to Article 94(3) EPC dated Jul. 1, 2019 in a counterpart European patent application No. 16786505.4.
The Japanese Office Action dated Sep. 24, 2019 in a counterpart Japanese patent application No. 2017-515568.
The Chinese Office Action dated Feb. 25, 2020 in a counterpart Chinese patent application No. 201680024673.8.
The Decision of Refusal dated Apr. 14, 2020 in a counterpart Japanese patent application No. 2017-515568.

* cited by examiner

FIG. 1
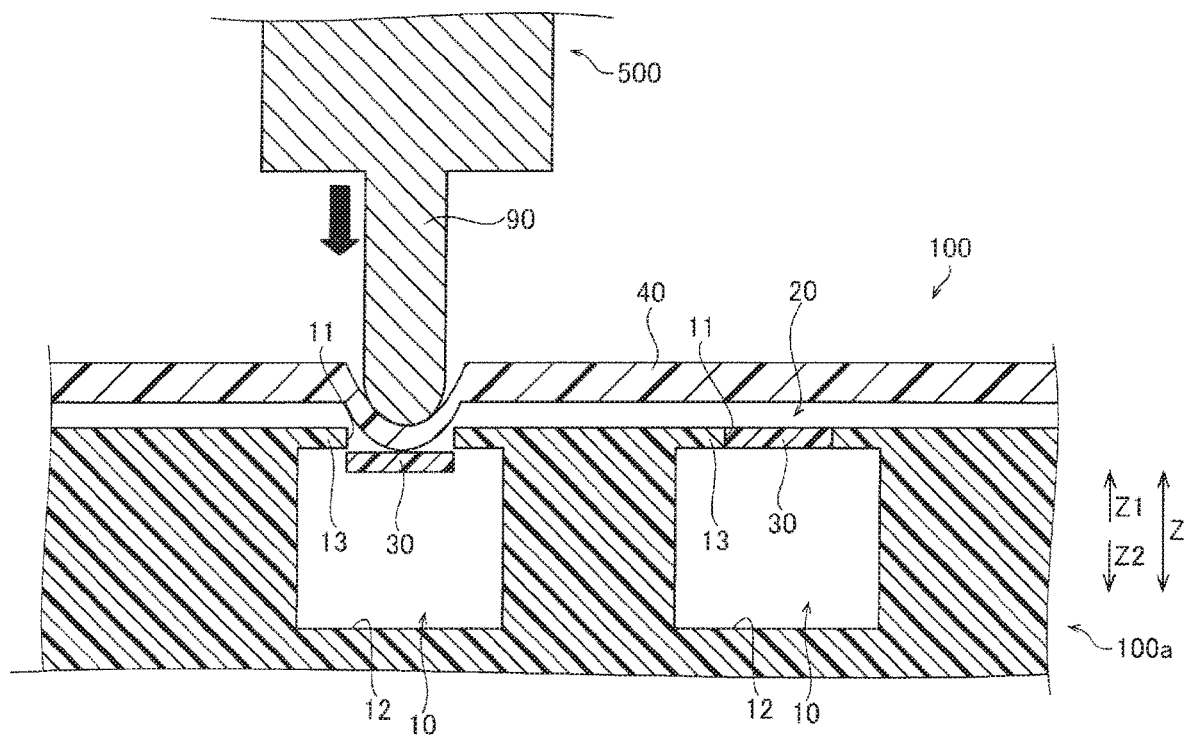
FIG. 2A  FIG. 2B  FIG. 2C
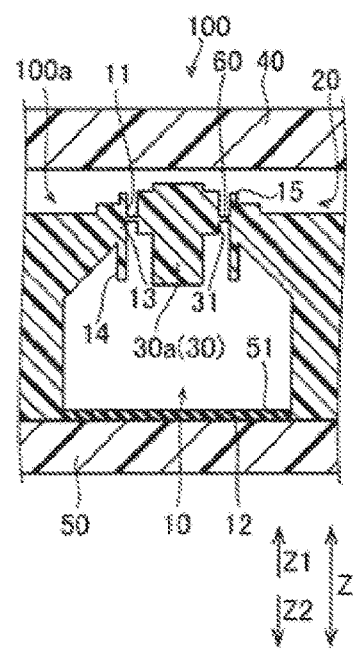 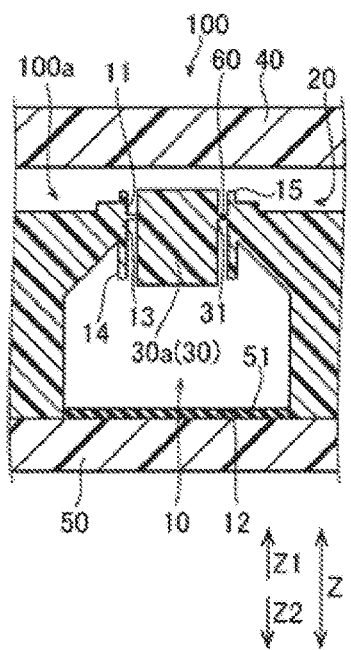 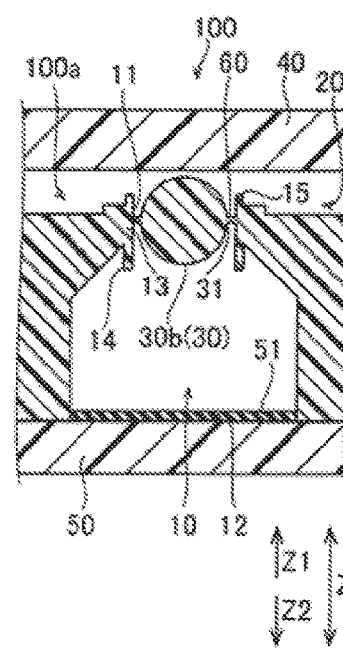

LIQUID-SEALED CARTRIDGE, SPECIMEN ANALYZER, AND SPECIMEN ANALYSIS METHOD

RELATED APPLICATIONS

This application is a continuation application of PCT/JP2016/063150 having an international filing date of Apr. 27, 2016, which claims priority to JP2015-093575 filed Apr. 30, 2015. The entire contents of these applications are incorporated herein by reference.

TECHNICAL FIELD

The present invention relates to a liquid-sealed cartridge, a specimen analyzer, and a specimen analysis method.

BACKGROUND ART

PATENT LITERATURE 1 discloses a cartridge provided with a plurality of chambers. Each of the plurality of chambers contains a reagent. The plurality of chambers are blocked from each other by means of a wax.

CITATION LIST

Patent Literature

[PTL 1] Japanese National Phase PCT Laid-Open Publication No. 2011-516034

SUMMARY OF THE INVENTION

Problems to be Solved by the Invention

In the cartridge described in PATENT LITERATURE 1, in a case where a lipophilic substance such as a protein or an antibody is contained in a reagent, there is a possibility that the lipophilic substance is eluted into the wax. Thus, during transportation or preservation of the cartridge, contamination could occur between adjacent chambers.

Solution to the Problems

A liquid-sealed cartridge according to a first aspect of the present invention is a liquid-sealed cartridge including: a cartridge body including a plurality of liquid storage portions; a seal body configured to seal an opening of each of the plurality of liquid storage portions and provided integrally with the cartridge body; and an elastic body disposed so as to be distanced above and opposed to the plurality of liquid storage portions, wherein a passage is provided between the liquid storage portions and the elastic body, and each of the plurality of liquid storage portions and the passage are configured to be communicated with each other, by the corresponding seal body being pushed to be opened through the elastic body.

A liquid-sealed cartridge according to a second aspect of the present invention is a liquid-sealed cartridge including: a cartridge body including a plurality of liquid storage portions; a seal body configured to seal an opening of each of the plurality of liquid storage portion; and an elastic body disposed so as to be distanced above and opposed to the plurality of liquid storage portions, the elastic body being configured to form a passage adjacent to the plurality of liquid storage portions, wherein each of the plurality of liquid storage portions and the passage are configured to be communicated with each other, by the corresponding seal body being pushed to be opened through the elastic body, and the cartridge body and each seal body provided above the corresponding liquid storage portion are formed from an identical hard material.

A liquid-sealed cartridge according to a third aspect of the present invention is a liquid-sealed cartridge including: a cartridge body including a plurality of liquid storage portions; a seal body configured to seal an opening of each of the plurality of liquid storage portions; and an elastic body disposed so as to be distanced above and opposed to the plurality of liquid storage portions, the elastic body being configured to form a passage adjacent to the plurality of liquid storage portions, wherein each of the plurality of liquid storage portions and the passage are configured to be communicated with each other, by the corresponding seal body being pushed to be opened through the elastic body, each liquid storage portion is provided with a first opening and a second opening, the first opening and the second opening are each provided with the seal body, the passage includes a first passage and a second passage that are provided so as to be separated from each other, the first opening is configured to be communicated with the first passage by the seal body being pushed to be opened through the elastic body, and the second opening is configured to be communicated with the second passage by the seal body being pushed to be opened through the elastic body.

A specimen analyzer according to a fourth aspect of the present invention is a specimen analyzer configured to perform analysis of a specimen, in which specimen analyzer the specimen is stored in a liquid-sealed cartridge, and the liquid-sealed cartridge having stored therein the specimen is disposed, the liquid-sealed cartridge including: a cartridge body including a plurality of liquid storage portions; a seal body configured to seal an opening of each of the plurality of liquid storage portions and provided integrally with the cartridge body; and an elastic body disposed so as to be distanced above and opposed to the plurality of liquid storage portions, wherein a passage is provided between the liquid storage portions and the elastic body, the specimen analyzer including a seal body opening portion configured to push and open each seal body through the elastic body in order to cause each of the plurality of liquid storage portions and the passage to be communicated with each other.

A specimen analysis method according to a fifth aspect of the present invention a specimen analysis method including: storing a specimen in a liquid-sealed cartridge, the liquid-sealed cartridge including a seal body configured to seal an opening of each of a plurality of liquid storage portions included in a cartridge body, the seal body being provided integrally with the cartridge body, and an elastic body disposed so as to be distanced above and opposed to the plurality of liquid storage portions, wherein a passage is provided between the liquid storage portions and the elastic body; and pushing and opening each seal body through the elastic body in order to cause each of the plurality of liquid storage portions and the passage to be communicated with each other, and performing analysis of the specimen by use of liquid.

Advantageous Effects of the Invention

According to the present invention, during transportation or preservation of a cartridge, occurrence of contamination between adjacent liquid storage portions can be inhibited.

BRIEF DESCRIPTION OF THE DRAWINGS

FIG. 1 is a schematic diagram showing the overview of a sealing mechanism in a liquid-sealed cartridge.

FIGS. 2A-2C are cross-sectional views each showing a seal body formed integrally with a liquid-sealed cartridge body.

BEST MODE FOR CARRYING OUT THE INVENTION

Figure 3:
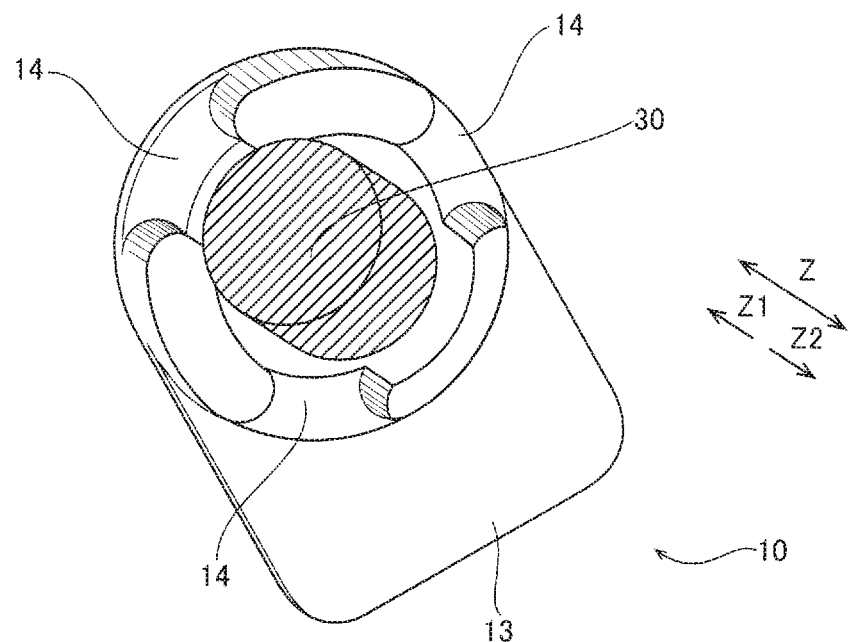
FIG. 3 is a diagram showing a guide of a liquid storage portion.
Figure 4:
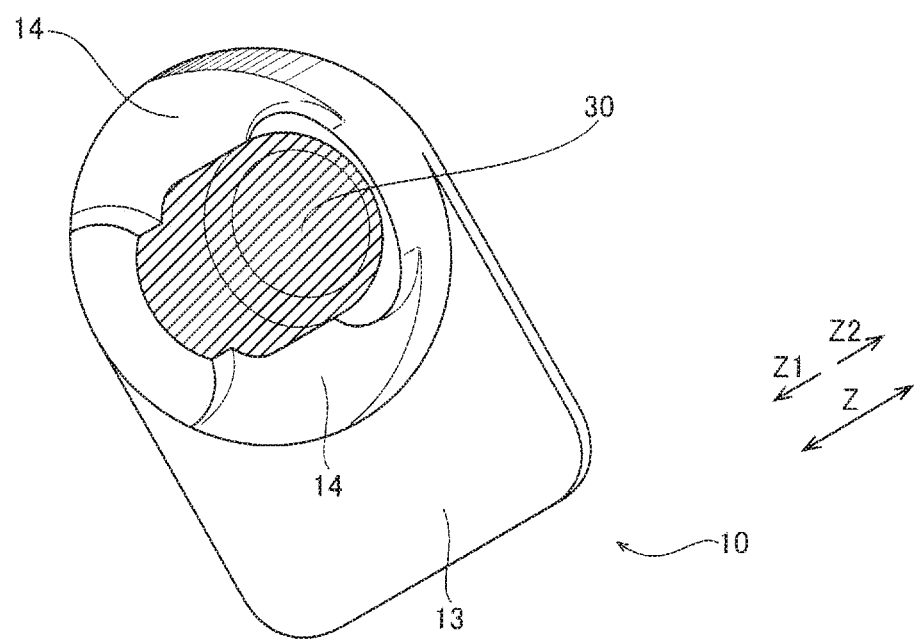
FIG. 4 is a diagram showing the guide having another shape.
Figure 5:
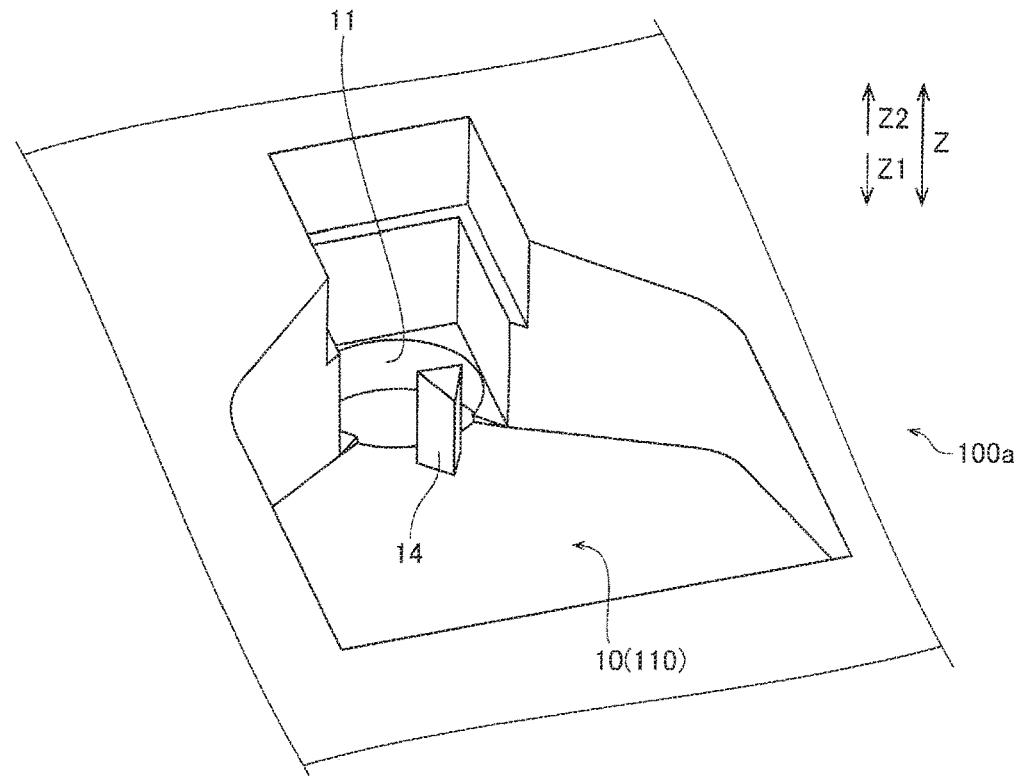
FIG. 5 is a diagram showing the guide having still another shape.

Hereinafter, embodiments will be described with reference to the drawings.

With reference to FIG. 1 to FIG. 36, configurations of a liquid-sealed cartridge 100 according to the present embodiment are described.

(Overview of Liquid-Sealed Cartridge)

The liquid-sealed cartridge (hereinafter, referred to as cartridge) 100 is a cartridge for performing specimen analysis. The specimen is blood, for example.

<Overview of Sealing Mechanism>

As shown in FIG. 1, the cartridge 100 includes a cartridge body 100a including a plurality of liquid storage portions 10. The cartridge 100 includes seal bodies 30 and an elastic body 40. A passage 20 is formed in the region between the plurality of liquid storage portions 10 and the elastic body 40. As the material forming the cartridge body 100a, various materials can be employed. For example, the cartridge body 100a can be formed from resin as a material.

In each of the plurality of liquid storage portions 10, a liquid to be used in specimen analysis is stored. Each liquid storage portion 10 includes an opening 11, a bottom face 12, and a seal body supporting portion 13. The opening 11 is formed at the opposite side to the bottom face 12. The seal body supporting portion 13 is formed around the opening 11. The seal body supporting portion 13 is provided in order to support the seal body 30 that is not yet opened.

The passage 20 is provided in order to transfer a liquid. The passage 20 is formed, in the thickness direction of the cartridge 100, at a position between the seal bodies 30 and the elastic body 40. The passage 20 extends along the horizontal direction. The passage 20 is formed so as to be adjacent to the plurality of liquid storage portions 10. Herein, "the thickness direction of the cartridge 100" is referred to as Z direction. The opening 11 side of each liquid storage portion 10 in the Z direction is referred to as Z1 side, and the bottom face 12 side of the liquid storage portion 10 in the Z direction is referred to as Z2 side.

The seal bodies 30 are provided in order to seal the openings 11, respectively. Each seal body 30 is provided in order to block the passage 20 from each of the plurality of liquid storage portions 10. The seal body 30 is opened through the elastic body 40, by being pushed from the Z1 side to the Z2 side. The seal body 30 is pushed to be opened through the elastic body 40 by a seal body opening portion 90 of a specimen analyzer 500. Accordingly, the inside of the liquid storage portion 10 and the passage 20 is communicated with each other. For example, the seal body 30 is formed from a material having a density smaller than the density of the liquid stored in the liquid storage portion 10. For example, the size of the seal body 30 is set to be slightly greater than that of the opening 11, so as to ensure the sealing ability by the seal body 30 being pressed in the opening 11 and so as to prevent the seal body 30 from coming off due to vibration and the like during transportation.

The elastic body 40 is disposed so as to be opposed to the plurality of liquid storage portions 10. By the upper face of the cartridge body 100a being covered by the elastic body 40, the passage 20 adjacent to the plurality of liquid storage portions 10 is formed. The elastic body 40 is provided in order to seal the passage 20 and the plurality of liquid storage portions 10. The elastic body 40 is made from a stretchable material. As the material forming the elastic body 40, various materials can be employed. For example, the elastic body 40 can be formed from resin. As the resin, for example, an elastomer material such as urethane can be employed. Alternatively, a rubber-based material such as silicone rubber is conceivable.

As the thickness for the elastic body 40, various thicknesses can be employed. The thickness of the elastic body 40 is set as appropriate on the basis of, for example, stretchability, resistance to breakage, easiness of handling, and further, magnet strength at the time of analysis described later. The thickness of the elastic body 40 is substantially 0.15 mm, for example. After being pushed by the seal body opening portion 90, the elastic body 40 can be restored to the shape thereof before being pushed. As a result, even if the elastic body 40 is pushed for opening the seal, narrowing of the passage 20 can be inhibited.

With the configuration described above, each of the plurality of liquid storage portions 10 and the passage 20 can be blocked from each other by the corresponding seal body 30. Thus, through the simple configuration, occurrence of contamination between adjacent liquid storage portions 10 during transportation or preservation of the cartridge 100 can be inhibited.

As the material forming the seal body 30 and the seal body supporting portion 13, various materials can be employed. For example, the seal body 30 can be formed of the same material as that of the seal body supporting portion 13, that is, the seal body 30 can be formed integrally with the seal body supporting portion 13. For example, the seal body 30 and the seal body supporting portion 13 can be formed of a polymethyl methacrylate (PMMA) resin used as the material. In this case, from the view point of productivity, production is preferably performed through resin molding such as injection molding. Accordingly, compared with a case where the seal body 30 and the seal body supporting portion 13 are formed from different materials, the structure of the cartridge 100 including the seal body 30 and the seal body supporting portion 13 can be simplified. Here, as the material of the seal body 30 and the seal body supporting portion 13, transparent materials such as cyclo olefin polymer (COP), polycarbonate (PC), and the like are conceivable, other than those mentioned above.

Either one of the seal body 30 and the seal body supporting portion 13 can be formed from a material softer than the other of the seal body 30 and the seal body supporting portion 13. That is, the seal body 30 may be formed from a material softer than the material of the seal body supporting portion 13, or alternatively, the seal body supporting portion 13 may be formed from a material softer than the material of the seal body 30. For example, the harder material is PMMA, and the softer material is a resin such as polypropylene (PP), polyethylene (PE), of polytetrafluoroethylene (PTFE, Teflon (registered trademark)). Accordingly, the softer member, either the seal body 30 or the seal body supporting portion 13, deforms more than the harder member, and as a result, the seal can be easily opened, and sealing ability at the time of providing sealing is increased.

<Specific Configuration of Sealing Mechanism>

Hereinafter, with reference to FIG. 2 and the following figures, a preferable embodiment of the sealing mechanism shown in FIG. 1 is specifically described.

As shown in FIG. 2, various shapes can be employed for the seal body 30. As shown in FIG. 2A, the seal body 30 can be in the form of a rod 30a, for example. As shown in FIG. 2B, as the shape of the rod 30a, a substantially columnar shape (see FIG. 3 and FIG. 4) or the like can be employed. Alternatively, as shown in FIG. 2C, the seal body 30 can be in the form of a bead 30b, for example. The bead 30b can be formed in a substantially spherical shape, for example. Further alternatively, the seal body 30 may be formed in a flat plate shape (see FIG. 1) obtained by reducing, in the Z direction, the thickness of the columnar-shaped rod 30a in FIG. 2B, for example. With the seal body 30 having such a simple configuration, each of the plurality of liquid storage portions 10 and the passage 20 can be easily blocked from each other.

The cartridge 100 includes a sheet member 50 at the Z2 side, for example. The sheet member 50 may be affixed to the face at the Z2 side of the cartridge body 100a. The sheet member 50 forms the bottom face 12 of the liquid storage portion 10. As the material forming the sheet member 50, various materials can be employed. For example, the sheet member 50 can be formed from resin. For example, as the resin, PET (polyethylene terephthalate) can be employed. Other than this, a film, a sheet, a plate, etc. made of the same material as that of the cartridge, PMMA, COP, or PC are conceivable.

As the thickness of the sheet member 50, various thicknesses can be employed as appropriate, on the basis of the material, the bonding method, and the like of the sheet. For example, the thickness of the sheet member 50 is substantially 0.1 mm.

The seal body 30 is provided integrally with the cartridge body 100a, for example. Accordingly, increase in the number of components and production costs associated with assembling can be inhibited. In addition, compared with a case where the seal body 30 is provided separately from the cartridge and set therein, reagent sealing ability is reliably provided. In a case where the seal body 30 is formed integrally with the cartridge body 100a, compared with a case where the seal body 30 is formed separately from the cartridge body 100a, sealing ability is ensured even if the seal body 30 has a non-circular shape, and thus, the seal body 30 can be formed in a desired shape.

The seal body 30 may be formed separately from the cartridge body 100a. Thus, when the design of the seal body 30 is to be changed, the design of only the seal body 30 needs to be changed, and the design of the cartridge body 100a need not be changed.

The liquid storage portion 10 may include an adhesive film 51 at the bottom face 12 therein. As the adhesive film 51, a pressure-fit-type film which adheres to an object when receiving a pressure applied from the object can be employed. The seal body 30 is pushed until coming into contact with the adhesive film 51, to be opened, thereby being fixed to the adhesive film 51.

The seal body 30 and the cartridge body 100a are connected to each other by a thin portion 60 for smoothly opening the seal, for example. The seal body 30 is connected to the thin portion 60 at a side portion 31. The seal body 30 is fixed to the seal body supporting portion 13 through the thin portion 60. Thus, if the seal body 30 is pushed and the thin portion 60 is broken, the seal can be easily opened. The thickness of the thin portion 60 is set as appropriate, on the basis of the sizes of the seal body 30 and the opening 11, easiness of breakage, difficulty in production, and the like. The thickness of the thin portion 60 is substantially 0.1 mm, for example. In order not to allow the thin portion, after being broken, to be inadvertently separated and cause influence on the analysis, it is preferable that the thin portion has a shape that allows the thin portion to stably remain at either the seal body 30 or the cartridge.

Above the opening 11, a step 15 is formed, for example. The step 15 is formed around the opening 11 where the seal body 30 is set, for example. When the seal body 30 having been opened falls into the liquid storage portion 10, the liquid may leak out to the region outside the step 15. After the seal is opened, reactions necessary for the specimen analysis are performed.

The liquid storage portion 10 includes a guide 14 for positioning the seal body 30 having been opened, for example. In the example shown in FIG. 3, three guides 14 are arranged around the seal body 30 at about 120 degree intervals. In the example shown in FIG. 4, the guide 14 may be arranged at each of both side portions of the seal body 30. The number of the guides 14 can be changed as appropriate.

As the shape of the guide 14, various shapes can be employed. For example, in the example shown in FIG. 5, the guide 14 extends in the Z2 direction from the vicinity of the opening 11. Accordingly, in a case where the seal body 30 is formed from a material having a greater density than the density of the liquid stored in the liquid storage portion 10, the seal body 30 having been opened sinks down to the bottom face 12 of the liquid storage portion 10 while being guided by the guide 14. As a result, the opened seal body 30 can be inhibited from moving to the vicinity of the opening 11 of the liquid storage portion 10.

Figure 6:
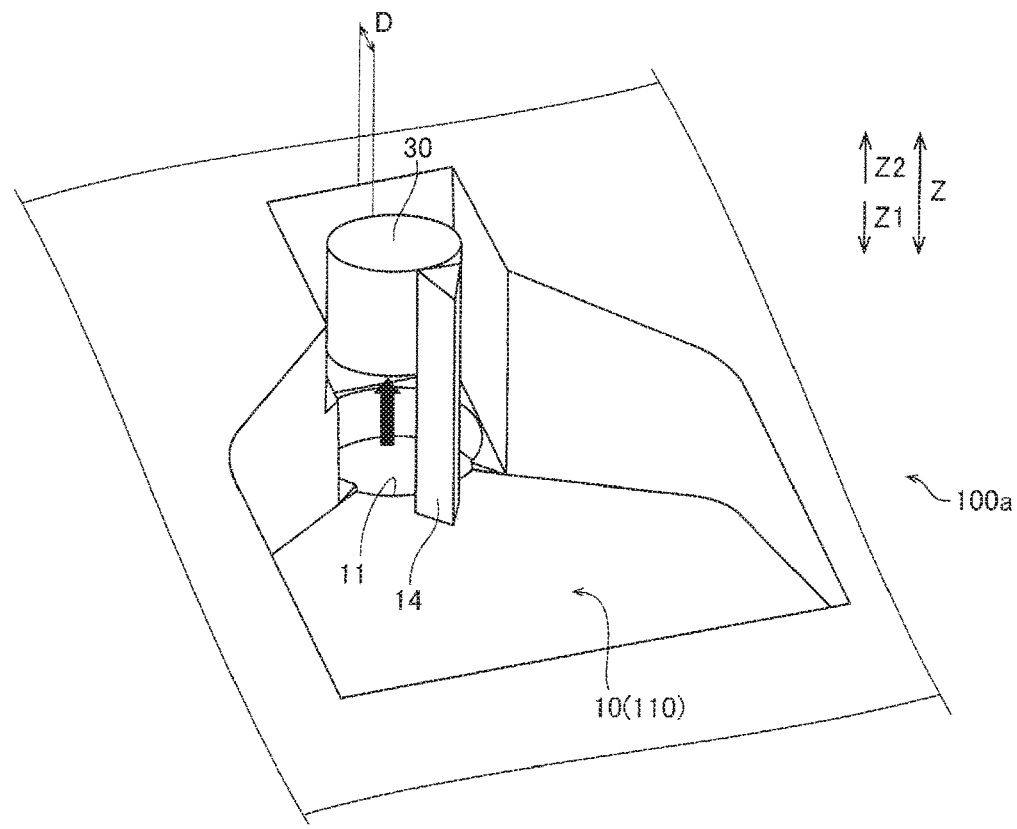
FIG. 6 is a diagram showing the guide having another shape.

In the example shown in FIG. 6, the guide 14 is formed so as to be able to fix the seal body 30 having been pushed along the guide 14 to be opened. The guide 14 is formed such that a distance D between the guide 14 and the inner wall face of the liquid storage portion 10 opposed to the guide 14 is reduced toward the bottom face 12 of the liquid storage portion 10. In a state where the seal body 30 is opened, the seal body 30 is sandwiched and fixed by the guide 14 and the inner wall face of the liquid storage portion 10 opposed to the guide 14. Accordingly, the opened seal body 30 can be inhibited from moving to the vicinity of the opening 11 of the liquid storage portion 10. If the distance D between the guide 14 and the inner wall face or between the guides 14 is set so as to be slightly smaller than the seal body 30, i.e., so as to realize a so-called pressed-in state, when the seal body 30 is pushed to be opened, the seal body 30 can be fixed at any position.

Figure 7A:
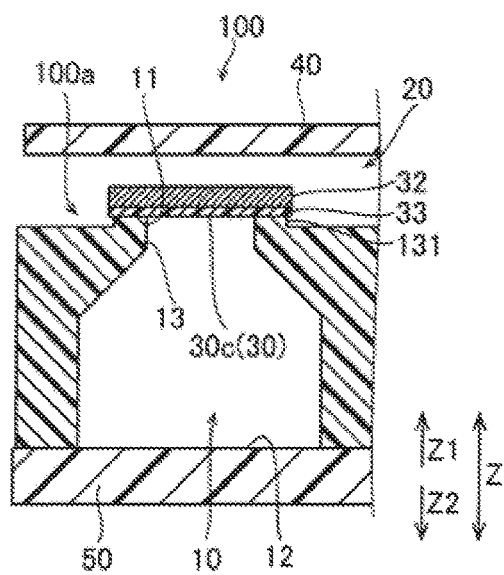
FIGS. 7A-7B are cross-sectional views each showing the seal body having another shape.
Figure 7B:
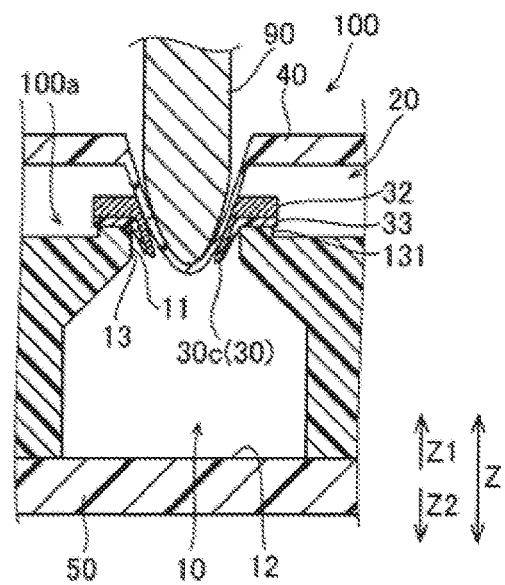

In the example shown in FIG. 7A, the seal body 30 may include a film 30c. That is, the seal body 30 in the film shape may be opened by being broken. Specifically, as shown in FIG. 7B, the film 30c is pushed through the elastic body 40 from the Z1 side to the Z2 side by the seal body opening portion 90 of the specimen analyzer 500, thereby being broken to be opened. Thus, the reagent can be effectively inhibited from flowing out to the passage 20 during preservation. The film 30c includes a barrier member 32 and an adhesive layer 33. The barrier member 32 is formed from an aluminum material, for example. The barrier member 32 is adhered to the seal body supporting portion 13 through the adhesive layer 33. The barrier member 32 may be formed from a metal material other than the aluminum material, or may be formed from a polymer material. Preferably, the barrier member 32 is formed from a material that does not allow the stored reagent to pass therethrough and that is easily broken when a predetermined force is applied to the barrier member 32.

As shown in FIG. 7A, the film 30c may be adhered to a protrusion 131 protruding to the Z1 side of the seal body supporting portion 13. The protrusion 131 is formed in an annular shape. The face on the Z1 side of the protrusion 131 is formed in a flat face shape so as to allow the film 30c to be easily affixed.

Figure 8:
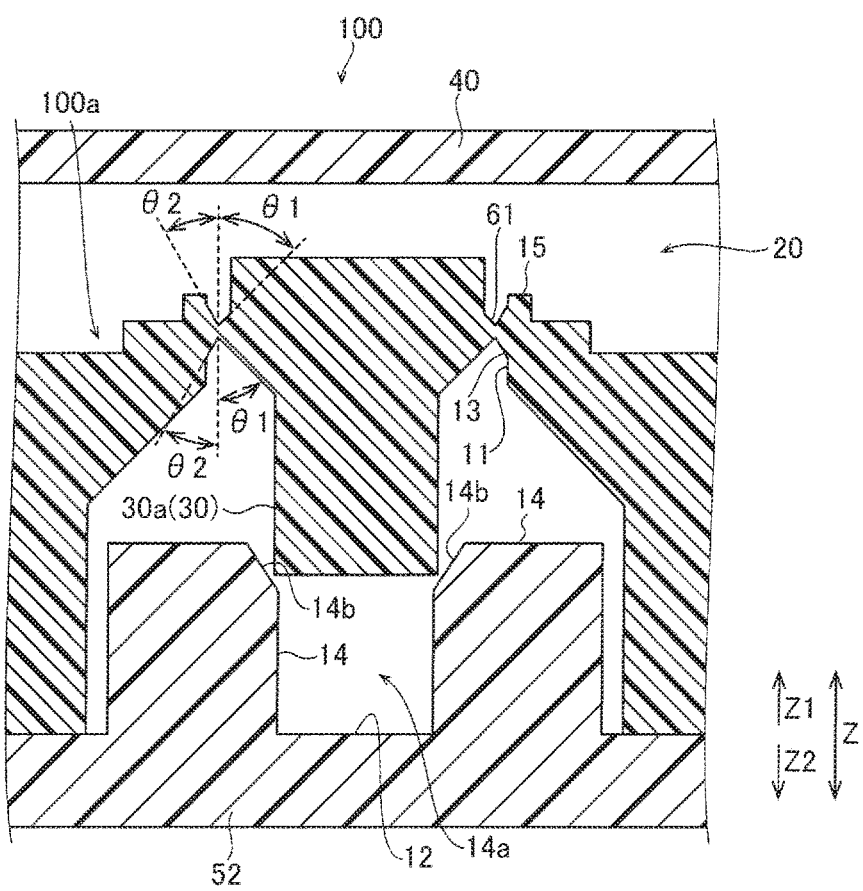
FIG. 8 is a cross-sectional view showing the seal body having still another shape.

As in the example shown in FIG. 8, the seal body 30 may be in the form of the rod 30a, and may be connected to the cartridge body 100a through a thin portion 61. The thin portion 61 may be formed such that the thickness thereof in the thickness direction (Z direction) of the cartridge body 100a is gradually reduced. The thin portion 61 includes a recess of which thickness is gradually reduced along a direction perpendicular to the thickness direction (Z direction) of the cartridge body 100a. For example, the recess of the thin portion 61 is formed in a V-shape in cross section. The recess of the thin portion 61 may be formed in a shape, in cross section, other than the V-shape. For example, the recess of the thin portion 61 may be formed in a U-shape in cross section. The recess of the thin portion 61 has an annular groove shape when viewed in the Z direction. The recess of the thin portion 61 may be provided at either the Z1 direction side or the Z2 direction side, but preferably, at both the Z1 direction side and the Z2 direction side. That is, the recess of the thin portion 61 may be provided at both sides in the thickness direction (Z direction) of the cartridge body 100a. In other words, the recess of the thin portion 61 may be provided both in the direction in which the seal body 30 is pushed when being opened, and a direction opposite to the direction in which the seal body 30 is pushed. The thickness direction of the cartridge body 100a may be the same direction (Z direction) as the depth direction of the liquid storage portion 10. Accordingly, when the seal body 30 is pushed from the Z1 side to the Z2 side, the stress is concentrated on the vertex of the V-shape, and thus, the seal can be easily opened. In addition, the cut position can be more accurately specified. As a result, burrs and the like are inhibited from being formed at irregular positions. Accordingly, stability when sending the reagent stored in the liquid storage portion 10 after the seal is opened can be ensured. In addition, since the seal can be opened such that the cut surface of the thin portion 61 is smooth, the resistance at the time of supplying the reagent can be inhibited from increasing.

The V-shape of the recess is formed in asymmetry in the radial direction of the rod 30a. Specifically, the recess has, at the radially inner side of the rod 30a, an inclination angle of $\theta 1$ with respect to the axial direction of the rod 30a. In addition, the recess has, at the radially outer side of the rod 30a, an inclination angle of $\theta 2$ with respect to the axial direction (Z direction) of the rod 30a. The recess is formed such that $\theta 1 > \theta 2$ is established. Accordingly, when the seal body 30 is pushed from the Z1 side, the thin portion 61 at the radially inner side of the rod 30a is readily deformed. Thus, the force at the time of opening the seal can be inhibited from increasing. As a result, the seal can be more easily opened, with inadvertent partial crack of the cartridge body 100a inhibited. It should be noted that the V-shape of the recess may be formed in substantial symmetry in the radial direction of the rod 30a.

Figure 9:
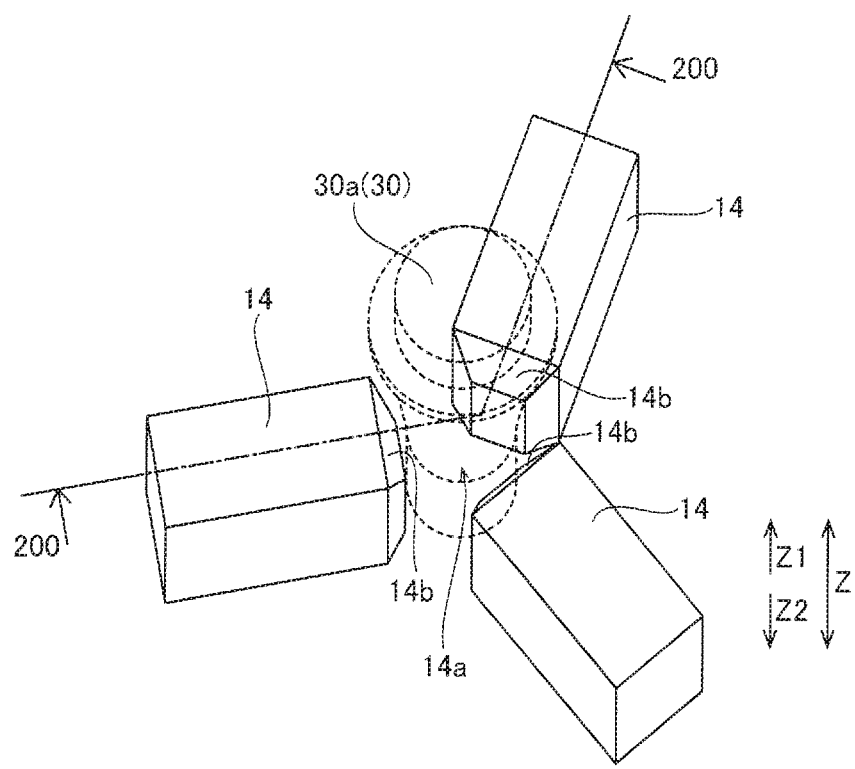
FIG. 9 is a perspective view showing the guide having still another shape.

As in the example shown in FIG. 8 and FIG. 9, the seal body 30 may be pressed into the guide 14 to be fixed therein. FIG. 8 is a cross-sectional view along the line 200-200 shown in FIG. 9. The guide 14 may include: a holder 14a configured to hold the opened seal body 30 while facing the seal body 30; and an inclined portion 14b which inclines along the thickness direction (Z direction) of the cartridge body 100a. That is, the holder 14a allows the seal body 30 to be interposed therein while facing the seal body 30 in the direction perpendicular to the thickness direction (Z direction) of the cartridge body 100a, thereby holding and fixing the seal body 30. When the seal body 30 is to be opened, the seal body 30 moves in the Z2 direction while being guided by the inclined portion 14b. Then, the seal body 30 is pressed into the holder 14a to be fixed therein. That is, the opened seal body 30 is held by the guide 14 composed of a plurality of guide members. Accordingly, the opened seal body 30 can be reliably inhibited from moving to the vicinity of the opening 11 of the liquid storage portion 10. As the guide 14, three guide members are arranged at about 120 degree intervals around the seal body 30.

The inclined portion 14b guides the seal body 30 to the position where the seal body 30 is to be fixed. That is, the inclined portion 14b guides the seal body 30 to the holder 14a. Specifically, the inclined portions 14b of the plurality of guide members are formed such that the interval thereamong is reduced along the thickness direction (Z direction) of the cartridge body 100a. Accordingly, the seal body 30 can be reliably guided to the position where the seal body 30 is to be pressed in the guide 14 to be fixed. Specifically, the end face at the Z2 side of the seal body 30 comes into contact with the inclined portions 14b when the seal is opened. In addition, the seal body 30 comes into contact with the inclined portions 14b before and after the thin portion 61 is cut at the time of opening the seal. As a result, the seal body 30 is guided toward the center direction with respect to the three guide members. In order to perform insertion of the seal body 30 into the guide 14 without resistance, it is preferable that the portion, of the seal body 30, that comes into contact with the inclined portion 14b is a smooth curved surface or in an R-shape. The guide 14 composed of three guide members may be provided integrally with a plate member 52. The plate member 52 is adhered to the face at the Z2 side of the cartridge body 100a, and forms the bottom face 12 of the liquid storage portion 10. The guide 14 and the plate member 52 are each formed from a resin material, for example. The guide 14 may be composed of a single guide member that includes a recess or a hole portion into which the seal body 30 is pressed. Alternatively, the guide 14 may be composed of two guide members or four or more guide members. It should be noted that the bottom face of the seal body 30 may be inclined. For example, a taper may be provided at the bottom face at the Z2 side of the seal body 30. Accordingly, similarly to the case where the guide 14 is provided with the inclined portion 14b, the seal body 30 can be reliably guided to the position where the seal body 30 is to be pressed into the guide 14 to be fixed therein.

Figure 10:
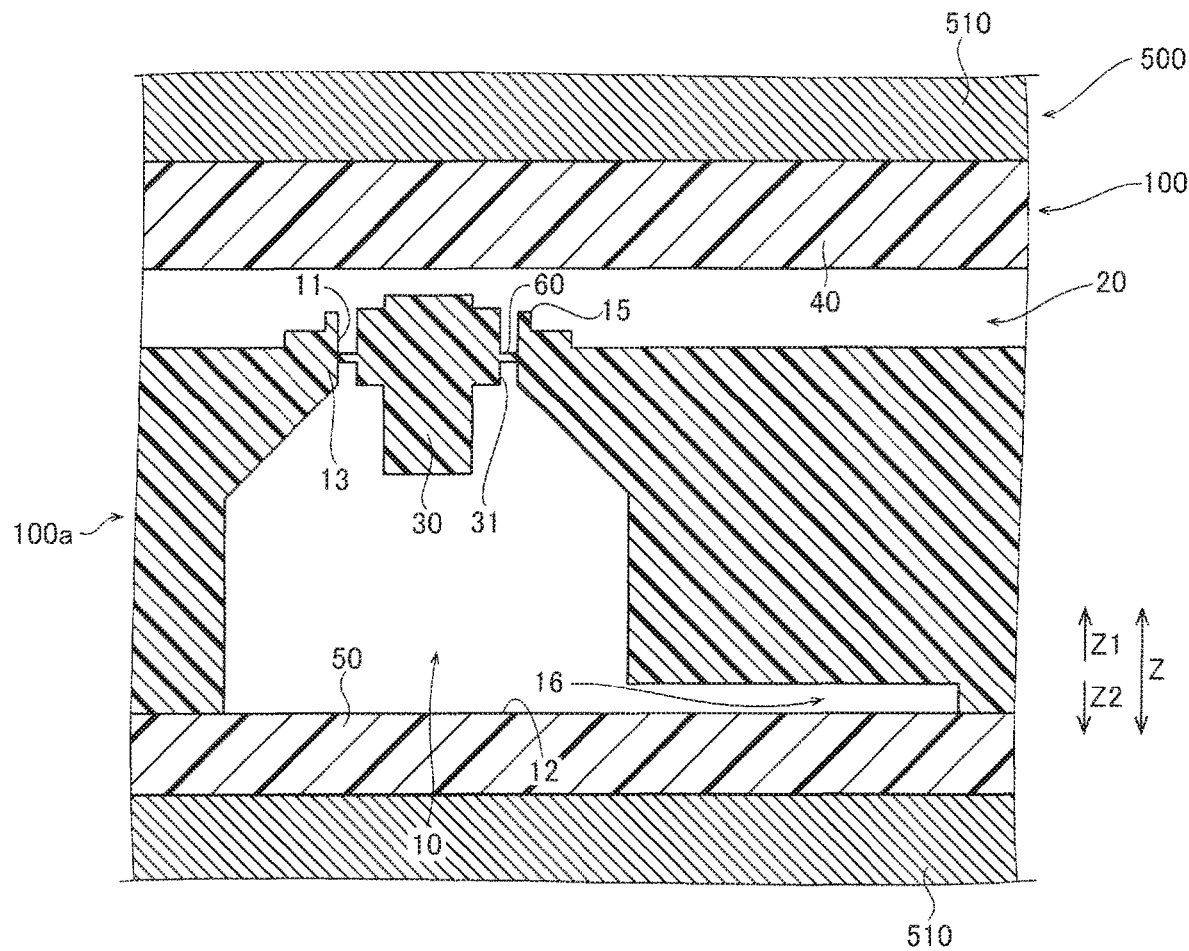
FIG. 10 is a cross-sectional view showing an air region of the liquid storage portion.

As shown in FIG. 10, for example, the liquid storage portion 10 includes an air region 16 for letting air to escape in order to fill a liquid. The air region 16 is a space connected to the inside of the liquid storage portion 10. The air region 16 is provided at the bottom face 12 side of the liquid storage portion 10. Accordingly, when a liquid is filled into the liquid storage portion 10 with the Z1 side of the cartridge body 100a set at the lower side, and then the Z2 side of the liquid storage portion 10 is sealed by the sheet member 50, air entering together with the liquid is allowed to escape to the air region 16, thereby being entrapped.

Meanwhile, by the seal body 30 being pushed in when being opened, the liquid in the liquid storage portion 10 enters a portion, of the air region 16, near the liquid storage portion 10. The liquid having entered the portion, of the air region 16, near the liquid storage portion 10 is pushed back to the liquid storage portion 10 side by the air entrapped in the air region 16. Accordingly, the liquid in the liquid storage portion 10 can be easily pushed out to the passage 20 side. It should be noted that the amount of the liquid to be pushed out to the passage 20 side can be easily adjusted by adjusting the amount of air to be entrapped in the air region 16.

The cartridge 100 can be disposed at a heat block 510 of the specimen analyzer 500. The heat block 510 adjusts the temperature of the cartridge 100. The heat block 510 is disposed so as to be in contact with each of both faces in the Z direction of the cartridge 100, for example. The heat block 510 may be disposed at positions away from both faces in the Z direction of the cartridge 100.

For example, the air region 16 is configured to be disposed at the vicinity of the heat block 510 for heating the cartridge 100. The temperature of the air entrapped in the air region 16 is increased due to the heat block 510. As a result, by increasing the internal pressure of the air entrapped in the air region 16, it is possible to adjust the height of the liquid surface relative to the liquid storage portion 10.

Figure 11:
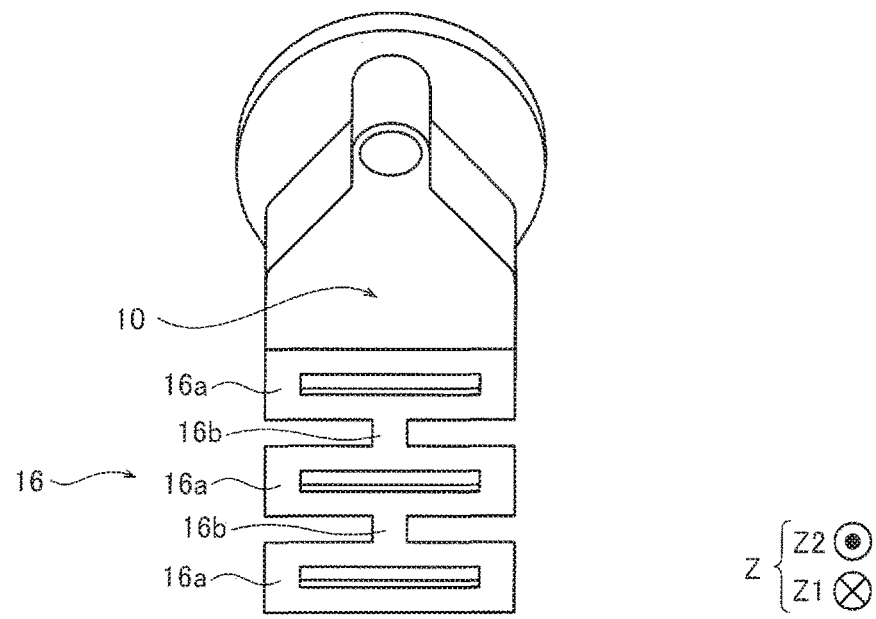
FIG. 11 is a diagram showing the air region having another shape.

As the air region 16, various configurations can be employed. For example, as shown in FIG. 11, an air region 16 may be provided that alternately includes wide portions 16a and narrow portions 16b each having a width narrower than that of the wide portion 16a, viewed from the Z2 side of the cartridge 100. It is preferable the air region 16 has a structure that is less likely to allow the liquid in the liquid storage portion 10 to enter the air region 16 during transportation, etc.

Figure 12:
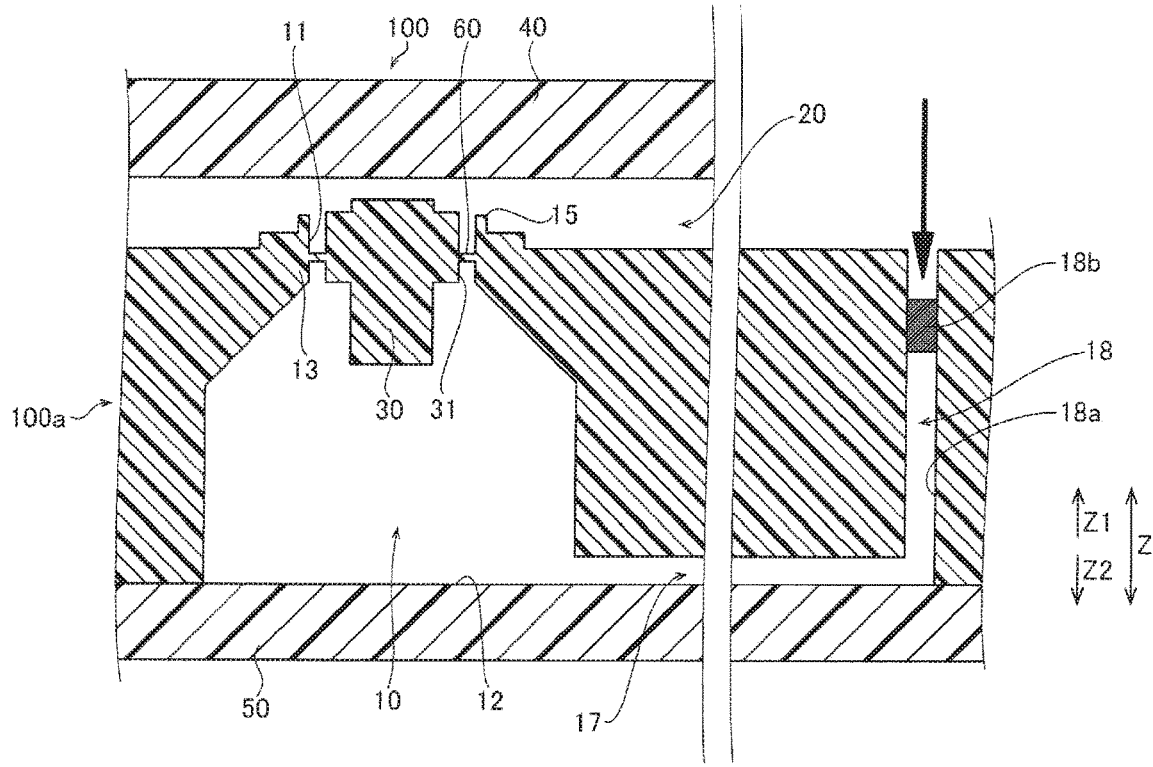
FIG. 12 is a diagram showing a liquid-sending path and a liquid-sending chamber.

As shown in FIG. 12, at the bottom face 12 side, for example, the liquid storage portion 10 may include: a liquid-sending path 17 for pushing out the liquid to the passage 20 side; and a liquid-sending chamber 18 communicated with the liquid-sending path 17. Accordingly, even in a case where the liquid surface is low after the seal is opened, the liquid can be pushed out to the passage 20 side, by increasing the liquid surface by use of the liquid-sending path 17 and the liquid-sending chamber 18.

As the configuration of the liquid-sending chamber 18, various configurations can be employed. For example, a liquid-sending chamber 18 may be provided that sends the liquid when a member 18b pressed in a press-in portion 18a of the liquid-sending chamber 18 is pushed. As the member that is pressed in the press-in portion 18a, a bead, a rod, or the like can be used. Accordingly, the liquid can be easily pushed out to the passage 20 side. Here, as the bead or the rod, the one that has a similar shape to that of the seal body 30 may be used.

Figure 13:
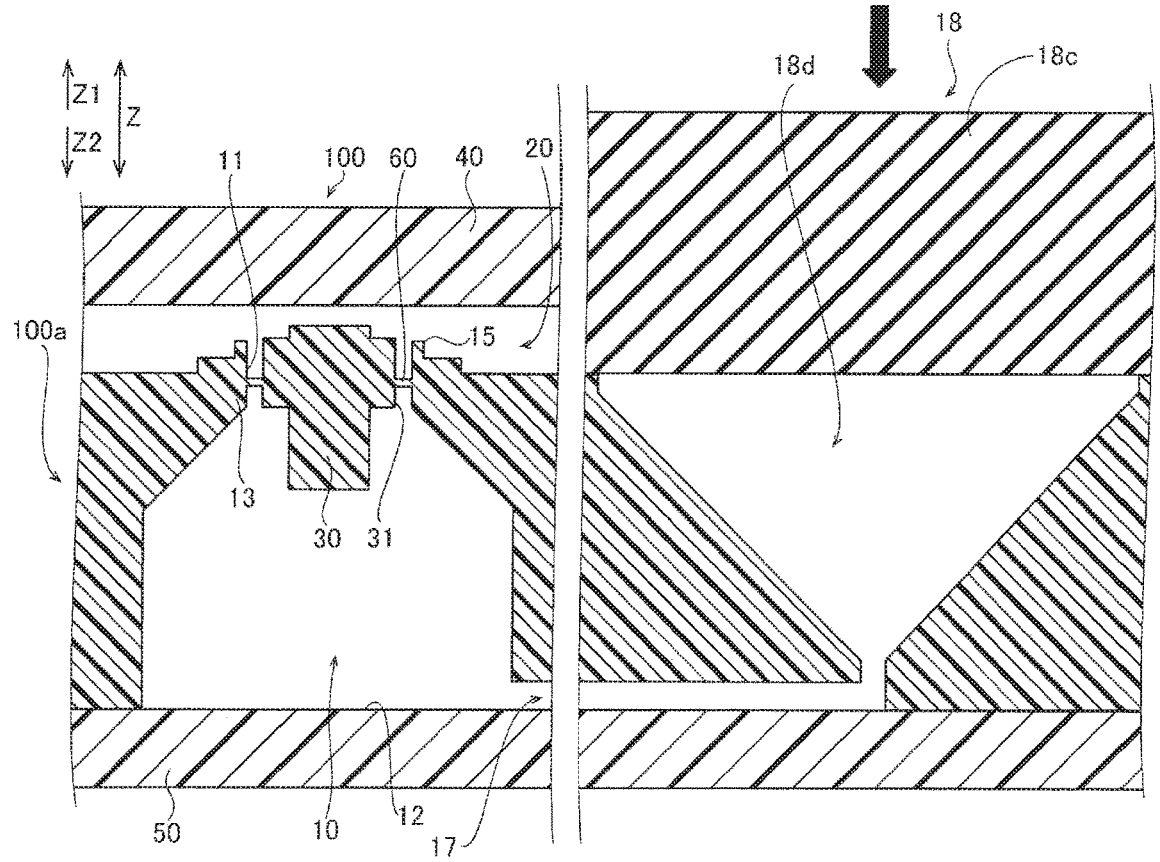
FIG. 13 is a cross-sectional view showing the liquid-sending chamber having another shape.
Figure 14A:
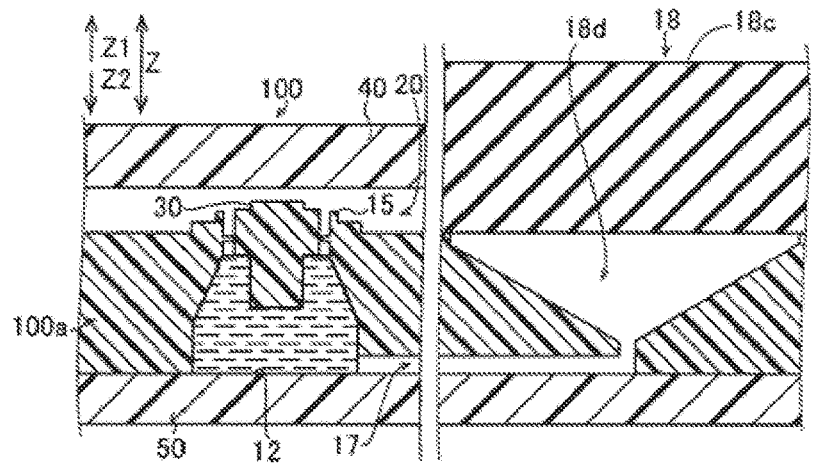
FIGS. 14A-14C are diagrams each showing a state where a liquid is pushed out to the passage side by the liquid-sending chamber.
Figure 14B:
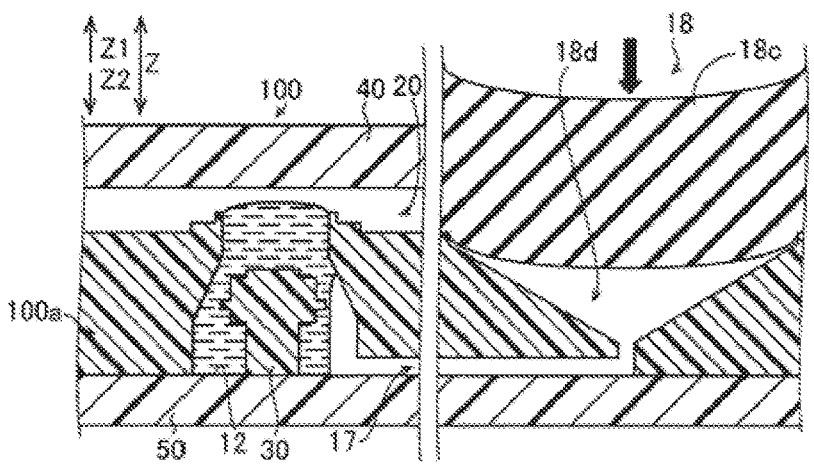
Figure 14C:
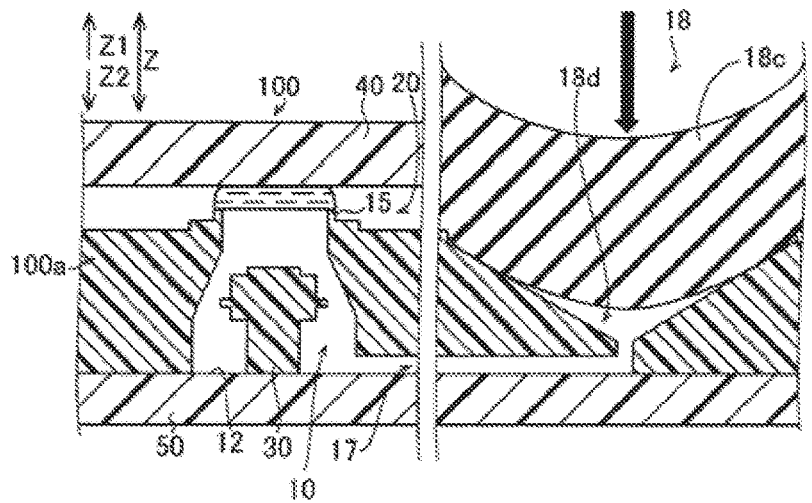

As shown in FIG. 13, a liquid-sending chamber 18 may be provided that is configured such that the volume of a space portion 18d is changeable by a deformation portion 18c being pushed. The liquid-sending chamber 18 is an air chamber, for example. The deformation portion 18c is an elastic body such as rubber, for example. The liquid-sending chamber 18 can easily push out the liquid to the passage 20 side by use of the air pressure that has occurred as a result of deformation of the liquid-sending chamber 18 from an initial state thereof to a contracted state thereof. FIG. 14 shows another configuration example to which this configuration is applied. The region, above the opening 11, where the liquid is to be stored may be enlarged, and all the liquid in the liquid storage portion 10 may be pushed out and sent to the passage 20. In the example shown in FIG. 14, after the seal is opened, the deformation portion 18c is pushed in the Z2 direction (FIG. 14B). In the state shown in FIG. 14B, part of the liquid in the liquid storage portion 10 is pushed out to the passage 20 side. From this state, the deformation portion 18c is further pushed in the Z2 direction (FIG. 14C). In the state shown in FIG. 14C, all the liquid in the liquid storage portion 10 is pushed out to the passage 20 side. In this case, since the liquid is present only at the passage 20 side, the seal body 30 does not become an obstruction during agitation and transfer of magnetic particles 191 described later, and thus, efficient agitation and transfer can be performed.

(Overview of Specimen Analyzer)

Figure 15:
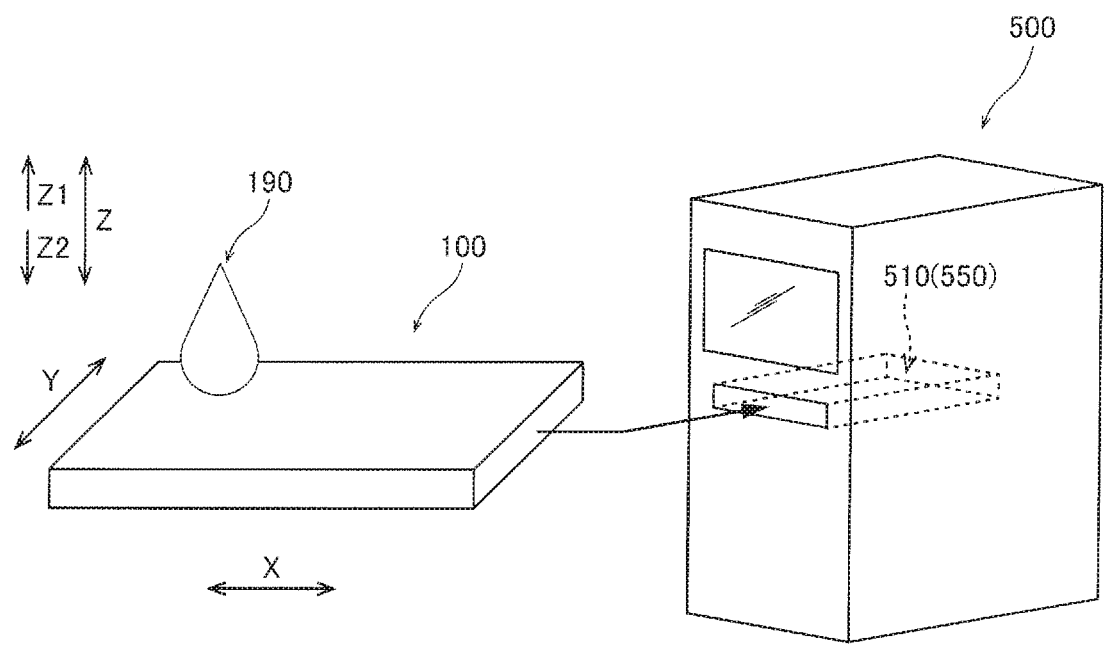
FIG. 15 is a diagram showing the overview of a specimen analyzer.

FIG. 15 is a diagram showing the overview of the specimen analyzer 500. The specimen analyzer 500 can determine the presence/absence of a specimen 190 in a sample, and the concentration of the specimen 190 in the sample. The specimen analyzer 500 has a size, for example, that allows the specimen analyzer 500 to be installed at a desk in an examination room where a doctor examines a patient. The installation area of the specimen analyzer 500 is about 150 cm' to 300 cm', for example. The specimen analyzer 500 is an apparatus for performing a test by use of the disposable cartridge 100 in order to analyze a sample. A liquid sample, such as tissue, body fluid, or blood, collected from a patient is injected into the cartridge 100. The cartridge 100 having the sample injected therein is inserted in a setting portion 550 of the specimen analyzer 500. The sample injected in the cartridge 100 is analyzed by a predetermined assay, in accordance with a function of the cartridge 100 and the function of the specimen analyzer 500. Although the example shown in FIG. 15 is a configuration example in which the heat block 510 (see FIG. 17) also serves as the setting portion 550 for the cartridge 100, the heat block 510 and the setting portion 550 may be provided separately.

(Configuration Example of Liquid-Sealed Cartridge)

Figure 16:
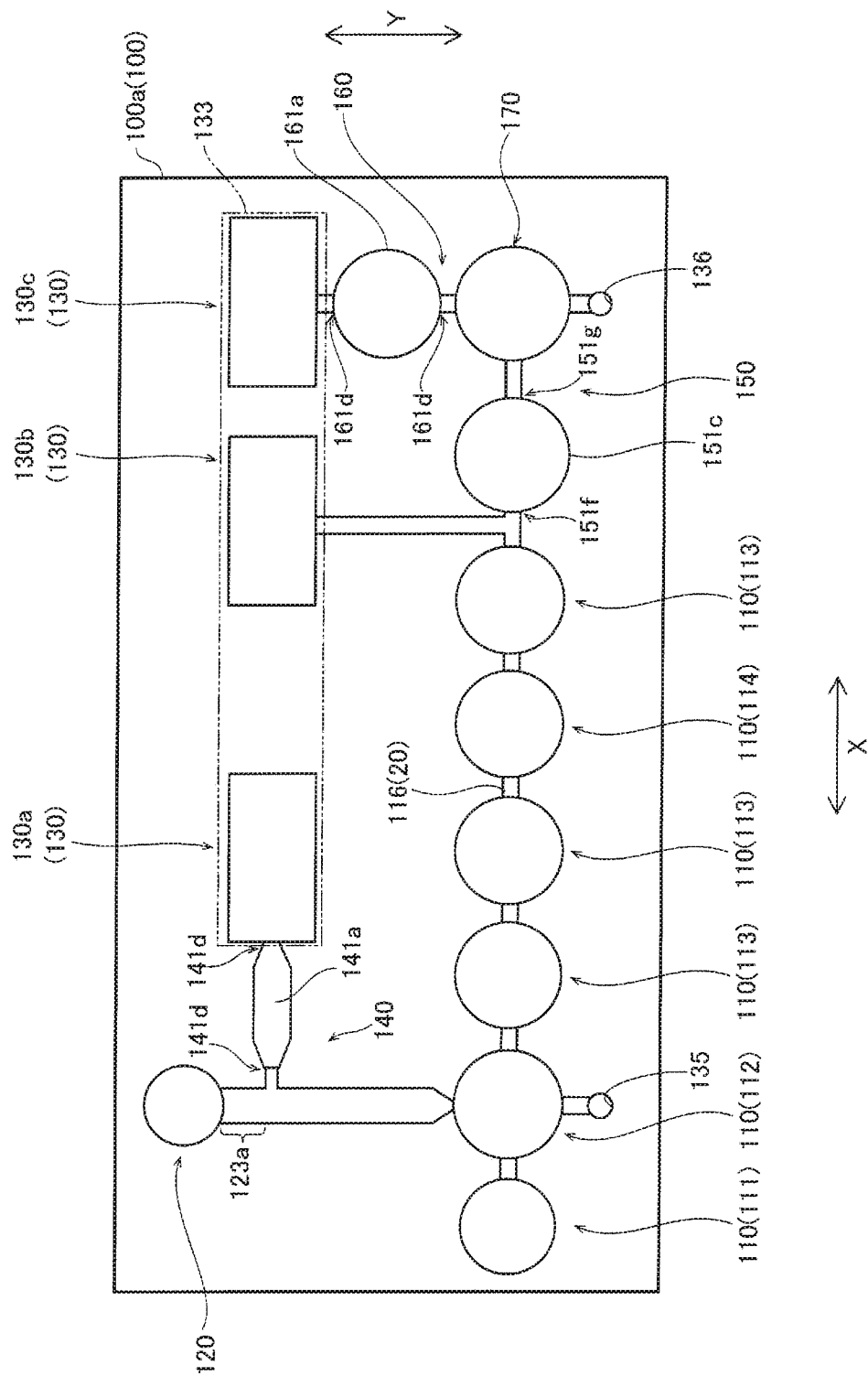
FIG. 16 is a diagram showing the liquid-sealed cartridge.

FIG. 16 is a diagram showing a configuration example of the cartridge 100. The cartridge 100 is formed in a flat plate shape. The cartridge 100 has a plurality of liquid storage portions 110 each for storing a liquid such as a sample, a reagent, a washing liquid, or the like. The plurality of liquid storage portions 110 can store R1 to R5 reagents. Some of the reagents contain magnetic particles 191 (see FIG. 18) which react with a substance containing the specimen 190 (see FIG. 18), and for example, an R2 reagent contains the magnetic particles 191. The cartridge 100 has a specimen-R1 reaction chamber 112 in which to hold a liquid obtained by mixing a sample and an R1 reagent. The cartridge 100 has washing chambers 113 each storing a washing liquid for separating a reaction product necessary for analysis of the specimen 190 from other substances. The cartridge 100 has a detection chamber 170 in which to hold a liquid containing a detection substance for detecting the specimen 190. In the vicinity of the specimen-R1 reaction chamber 112, an opening 135 communicated with the outside is provided. The specimen-R1 reaction chamber 112 is connected to the opening 135. In the vicinity of the detection chamber 170, an opening 136 communicated with the outside is provided. The detection chamber 170 is connected to the opening 136.

It should be noted that the liquid storage portion 110 is shown as one example of the liquid storage portion 10 shown in FIG. 1. The seal body 30 shown in FIG. 1 can also be provided to each of two reduced-diameter portions 141d of a reagent storage part 141a in an R1 reagent chamber 141, for example. The seal body 30 shown in FIG. 1 can also be provided to each of reduced-diameter portions 151f and 151g in an R4 reagent chamber 151c, for example. The seal body 30 shown in FIG. 1 can also be provided to each of two reduced-diameter portions 161d of an R5 reagent chamber 161, for example. In FIG. 15 and thereafter, the seal body 30 is indicated by a broken line.

Herein, the notion "to react" includes that a plurality of substances "bind to one another".

With respect to an R2 reagent chamber 111, the specimen-R1 reaction chamber 112, the washing chambers 113, and an R3 reagent chamber 114, the magnetic particles 191 are transferred between the liquid storage portions 110, whereby reactions necessary for analysis of the specimen 190 advance. The sample is dropped into a blood cell separation portion 120 of the cartridge 100. The cartridge 100 having the sample dropped in the blood cell separation portion 120 is inserted into the specimen analyzer 500 (see FIG. 15). The cartridge 100 has an air chamber 130. By the air sent out from the air chamber 130, the liquid in some of the liquid storage portions 110 in the cartridge 100 is transferred. The air chamber 130 is covered by an elastic member 133 such as a rubber sheet. This configuration is substantially the same as that of the liquid-sending chamber shown in FIG. 14.

(Configuration Example of Analyzer)

Figure 17:
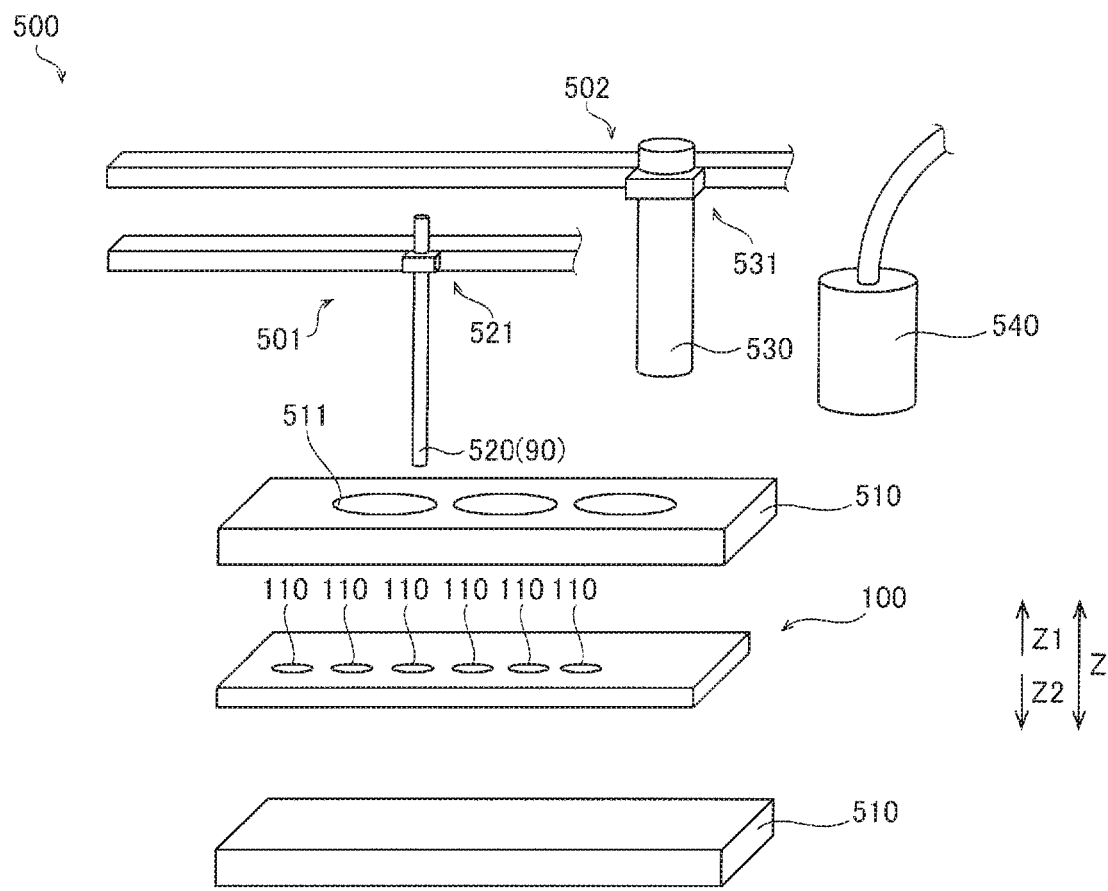
FIG. 17 is a diagram showing a configuration example of the specimen analyzer.

FIG. 17 shows a configuration example of the specimen analyzer 500. The specimen analyzer 500 includes a magnet unit 501, a plunger unit 502, the heat blocks 510, and a detection unit 540.

The magnet unit 501 includes: a magnet 520 in a columnar shape and serving as a magnetic force source; and a movement mechanism unit 521 for causing the magnet 520 to move relative to the cartridge 100. The movement mechanism unit 521 can move the magnet 520 in the horizontal direction and the up-down direction (thickness direction of the cartridge 100). In a case where the liquid storage portions 110 are linearly arranged, it is sufficient that the movement mechanism unit 521 can horizontally move only in one linear axial direction along the direction in which the liquid storage portions 110 are arranged. The magnet 520 is shown as one example of the seal body opening portion 90 shown in FIG. 1. It is also conceivable that a plunger for opening the seal body is provided separately from the magnet.

The upper face of the cartridge 100 is the face that corresponds to the side at which the magnet 520 for transferring the magnetic particles 191 is disposed.

In the specimen analyzer 500, the magnetic particles 191 (see FIG. 18) contained in some of the liquid storage portions 110 of the cartridge 100 are transferred by magnetic force of the magnet 520.

The plunger unit 502 includes: a plunger 530 for actuating the air chamber 130; and a movement mechanism unit 531 for moving the plunger 530 relative to the cartridge 100, for example. The movement mechanism unit 531 can move the plunger 530 in the up-down direction.

The specimen analyzer 500 can cause the plunger 530 to push the elastic member 133 (see FIG. 16) covering the air chamber 130 of the cartridge 100. By the elastic member 133 being pushed, the liquid is transferred.

The heat block 510 has holes 511 for allowing the magnet 520 and the plunger 530 to access the cartridge 100. The holes 511 are provided in the heat block 510 disposed at the upper face of the cartridge 100, for example. Some of the holes 511 may be recesses that do not penetrate the heat block 510.

The detection unit 540 is disposed at a position at which the detection unit 540 can be close to the detection chamber 170 of the cartridge 100. The detection unit 540 detects light emitted from a reaction product generated as a result of reaction between the specimen 190 and the reagents. The detection unit 540 is a photomultiplier, for example.

(Description of Assay)

Figure 18:
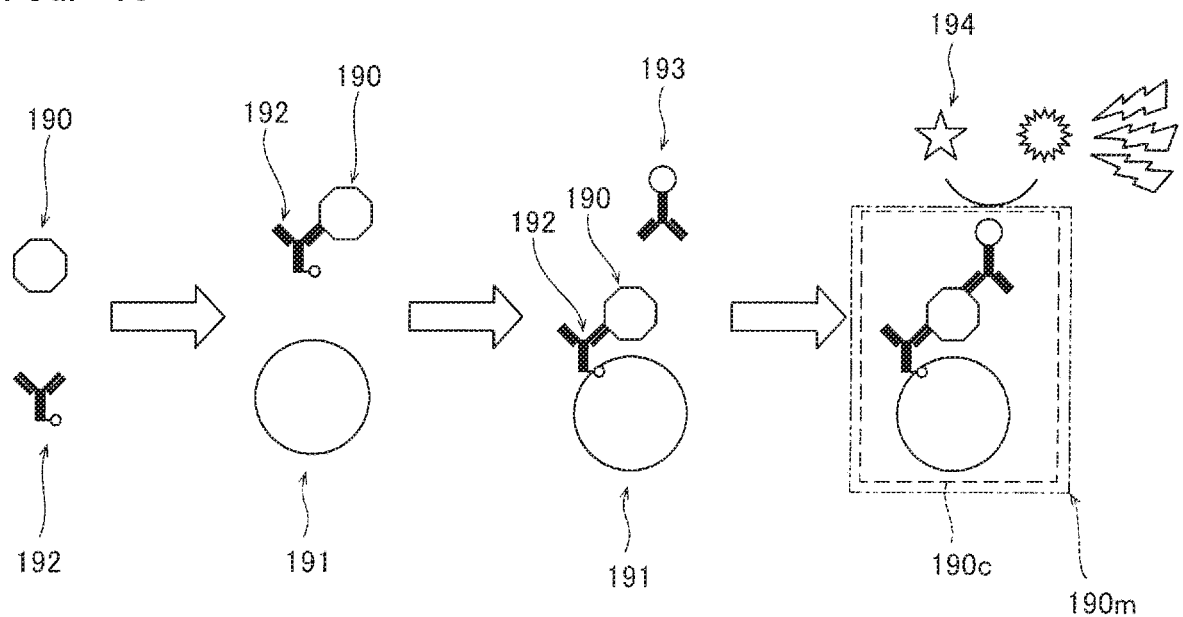
FIG. 18 is a diagram showing the outline of an assay.

The outline of an assay is described with reference to FIG. 18.

The specimen 190 includes an antigen or an antibody, for example. The antigen is Hepatitis B surface antigen (HBsAg), for example.

The R1 reagent contains a capture substance 192 that binds to the specimen 190. The R1 reagent can be selected in accordance with the specimen 190. The capture substance 192 contains an antibody or an antigen. The antibody is a biotin-bound anti-HBs monoclonal antibody, for example.

The specimen 190 bound to the capture substance 192 binds to the magnetic particle 191 in the R2 reagent through the capture substance 192. The magnetic particle 191 serves as a carrier for the specimen 190. The magnetic particle 191 is a streptavidin-bound magnetic particle the surface of which is coated with avidin, for example. Avidin of the magnetic particle 191 has high binding ability to biotin in the R1 reagent. Thus, the binding ability between the magnetic particle 191 and the capture substance 192 is improved.

The bound body composed of the specimen 190, the capture substance 192, and the magnetic particle 191 is separated from unreacted substances through washing by use of a washing liquid.

After washing, the bound body composed of the specimen 190, the capture substance 192, and the magnetic particle 191 reacts with a labeling substance 193 in the R3 reagent. The labeling substance 193 contains a labeled antibody, for example. The labeled antibody is an ALP labeled anti-HBsAg monoclonal antibody, for example.

The labeling substance 193 binds to the specimen 190, for example. The labeling substance 193 may bind to the capture substance 192, or may bind to the magnetic particle 191.

A substance obtained by at least causing the specimen 190 and the magnetic particle 191 to react with the labeling substance 193 will be referred to as "complex 190c". The complex 190c may contain the capture substance 192, for example.

The complex 190c and unreacted substances are separated from each other through washing by use of a washing liquid.

After washing, the complex 190c is mixed with the R4 reagent. A substance obtained by causing the complex 190c and the R4 reagent to react with each other will be referred to as "mixture 190m". The R4 reagent has a composition that promotes light emission from the complex 190c. The R4 reagent is a buffer solution, for example.

The R5 reagent is added to the mixture 190m. The R5 reagent contains a substrate 194 that reacts with the complex 190c to prompt light emission therefrom, for example.

The complex 190c reacts with the R5 reagent to emit light. The detection unit 540 measures the intensity of light emitted from the complex 190c.

It should be noted that the combination of the specimen 190, the capture substance 192, the magnetic particle 191, and the labeling substance 193 may be a combination other than that described above. For example, the specimen 190, the capture substance 192, the magnetic particle 191, and the labeling substance 193 may be a TP antibody, a biotin-bound TP antigen, a streptavidin-bound magnetic particle, and an ALP labeled TP antigen, respectively. Alternatively, the specimen 190, the capture substance 192, the magnetic particle 191, and the labeling substance 193 may be an HCV antibody, a biotin-bound HCV antigen, an HCV antigen immobilized magnetic particle, and an ALP labeled anti-human IgG monoclonal antibody, respectively. Alternatively, the specimen 190, the capture substance 192, the magnetic particle 191, and the labeling substance 193 may be FT4, a biotin-bound anti-T4 monoclonal antibody, a streptavidin-bound magnetic particle, and an ALP labeled T3, respectively.

Alternatively, the specimen 190 may be either of an HIV-1p24 antigen and an anti-HIV antibody, the capture substance 192 may be a biotin-bound anti-HIV-1p24 antibody, the magnetic particle 191 may be a bound magnetic particle having streptavidin and an immobilized HIV antigen, and the labeling substance 193 may be either of an ALP labeled anti-HIV-1p24 antibody and an ALP labeled HIV antigen.

(Operation Example when Assay is Performed)

An operation example when the above-described assay is performed by use of the specimen analyzer 500 and the cartridge 100 is described with reference to FIG. 16 to FIG. 19.

Figure 19:
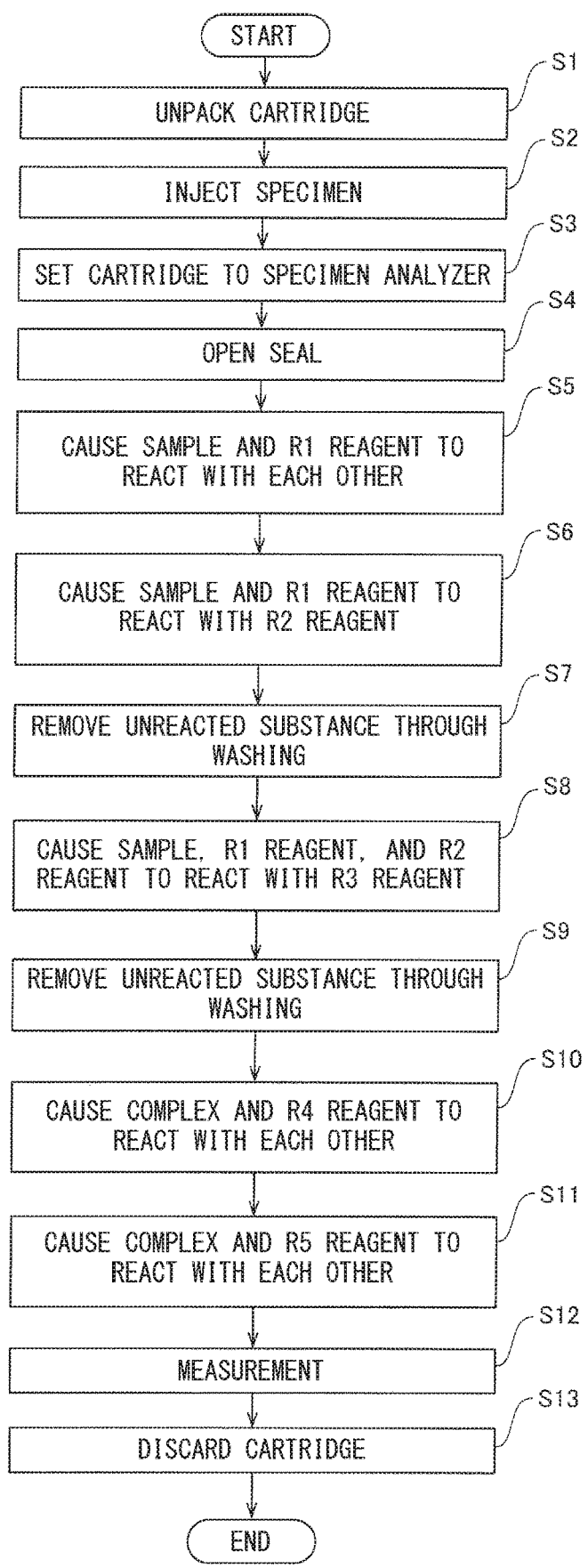
FIG. 19 is a flow chart showing an operation example when performing the assay.

In S1 shown in FIG. 19, the cartridge 100 is unpacked by a user.

In S2, a sample collected from a patient is dropped into the blood cell separation portion 120 of the unpacked cartridge 100.

In S3, the cartridge 100 into which the sample has been dropped is set to the setting portion 550 of the specimen analyzer 500 by the user. The sample dropped into the cartridge 100 flows from the blood cell separation portion 120 through specimen flow-in path 123a to a position near the specimen-R1 reaction chamber 112 in a specimen-R1 flow path 140, and then stops. After S3, the temperature of the cartridge 100 may be adjusted by the heat block 510.

In S4, the specimen analyzer 500 causes the magnet 520 to move in the Z2 direction to push a seal body 30 in the Z2 direction to be opened. The seals are opened for all of the liquid storage portions 110.

In S5, the specimen analyzer 500 causes the antigen contained in the specimen 190 and the antibody contained in the R1 reagent to react with each other. The specimen analyzer 500 causes the plunger 530 to push an air chamber 130a. The R1 reagent is pushed out to the specimen-R1 flow path 140 where the sample is present, by the air sent out from the air chamber 130a. The specimen analyzer 500 causes the plunger 530 to further push the air chamber 130a, thereby causing the sample and the R1 reagent to be pushed out to the specimen-R1 reaction chamber 112.

In S6, the specimen analyzer 500 causes the specimen 190 and the capture substance 192 in the R1 reagent to react with the magnetic particles 191 contained in the R2 reagent. The specimen analyzer 500 causes the magnet 520 to attract the magnetic particles 191 to the vicinity of the liquid surface of the R2 reagent chamber 111. The specimen analyzer 500 causes the attracted magnetic particles 191 to be transferred to the specimen-R1 reaction chamber 112 by use of the magnetic force of the magnet 520, thereby causing the magnetic particles 191 to react with the specimen 190 and the capture substance 192.

In S7, the specimen analyzer 500 causes the magnetic particles 191 reacted with the specimen 190 and the capture substance 192 to be transferred to the washing chamber 113, by use of the magnetic force of the magnet 520. In the washing chamber 113, the magnetic particles 191 reacted with the specimen 190 and the capture substance 192 are separated form unreacted substances.

In S8, the specimen analyzer 500 causes the magnetic particles 191 reacted with the specimen 190 and the capture substance 192 to be transferred to the R3 reagent chamber 114, by use of the magnetic force of the magnet 520. The specimen analyzer 500 causes the magnetic particles 191 reacted with the specimen 190 and the capture substance 192 to be mixed with the R3 reagent. Accordingly, the magnetic particles 191 reacted with the specimen 190 and the capture substance 192 react with the labeling substance 193 contained in the R3 reagent, whereby the complex 190c containing the capture substance 192 is generated.

In S9, the specimen analyzer 500 causes the complex 190c containing the capture substance 192 to be transferred to the washing chamber 113 by use of the magnetic force of the magnet 520, whereby the complex 190c containing the capture substance 192 is separated from unreacted substances.

In S10, the specimen analyzer 500 causes the complex 190c containing the capture substance 192 to be transferred to the R4 reagent chamber 151c by use of the magnetic force of the magnet 520. The complex 190c containing the capture substance 192 is mixed with the buffer solution contained in the R4 reagent chamber 151c. The specimen analyzer 500 causes the plunger 530 to push an air chamber 130b, thereby pushing out the mixture 190m to the detection chamber 170.

In S11, the substrate 194 contained in the R5 reagent is added to the mixture 190m. The specimen analyzer 500 causes the plunger 530 to push an air chamber 130c. Accordingly, the R5 reagent is pushed out to the detection chamber 170. The R5 reagent pushed out to the detection chamber 170 is added to the mixture 190m in the detection chamber 170.

In S12, the detection unit 540 detects light generated through reaction between the substrate 194 and the labeling substance 193 contained in the mixture 190m. The detection unit 540 measures the intensity of the emitted light, for example.

In S13, the cartridge 100 with which the measurement has been completed is pulled out from the specimen analyzer 500 by the user, and is discarded. From the discarded cartridge 100, waste liquid is not produced.

(Configuration of Liquid Storage Portion)

The liquid storage portions 110 in the cartridge 100 are described with reference to FIG. 20.

At least one liquid storage portion 110 among the liquid storage portions 110 has a structure for inhibiting the liquid in the one liquid storage portion 110 from being mixed with the liquid in other liquid storage portions 110.

In the present embodiment, each of the R2 reagent chamber 111, the specimen-R1 reaction chamber 112, the washing chambers 113, the R3 reagent chamber 114, and the R4 reagent chamber 151c shown in FIG. 16 has a structure for inhibiting the liquid in the liquid storage portion 110 from being mixed with the liquids in other liquid storage portions 110. The R2 reagent chamber 111, the specimen-R1 reaction chamber 112, the washing chambers 113, the R3 reagent chamber 114, and the R4 reagent chamber 151c are connected in series, through a gas phase space of a passage 116. The passage 116 is shown as one example of the passage 20 in FIG. 1.

Here, the gas phase space means a space filled with gas through which the magnetic particles 191 inevitably passe, when the magnetic particles 191 are transferred from the liquid in one liquid storage portion 110 to the liquid in an adjacent liquid storage portion 110. The entirety of the inside of the passage 116 may be a gas phase space, but a part of the inside of the passage 116 may be a gas phase space. Specifically, it is sufficient that a part of the transfer route of the magnetic particles 191 in the passage 116 between two adjacent liquid storage portions 110 is a gas phase space. As the gas, air is preferable, but nitrogen or the like can also be used.

Since mixing among liquids is the inhibited, carryover is inhibited. If carryover has occurred, a liquid such as a reagent is diluted. Due to the reduced liquid concentration as a result of the dilution, the reaction condition in the liquid changes. Due to the change in the reaction condition, for example, the effect of reaction between the specimen 190 and the substance in the reagent is reduced, and as a result, measurement accuracy of the specimen analyzer 500 is adversely influenced.

The specimen analyzer 500 executes an assay by causing the magnetic particles 191 to be transferred between the liquid storage portions 110. Thus, the specimen analyzer 500 can execute the assay for analysis, while inhibiting the liquid in a liquid storage portion 110 from being mixed into the liquid in an adjacent liquid storage portion 110 due to the movement of the magnetic particles 191. If the liquid stored in a liquid storage portion 110 is mixed into the liquid stored in another liquid storage portion 110 due to the movement of the magnetic particles 191, the reaction condition in the liquid in the another liquid storage portion 110 changes. Due to the change in the reaction condition, for example, the effect of reaction between the specimen and the substance in the reagent is reduced, and as a result, the accuracy of the measurement result of the specimen analyzer 500 could be influenced. Therefore, by inhibiting the liquid stored in a liquid storage portion 110 from being mixed into the liquid stored in another liquid storage portion 110, the accuracy of analysis performed by the specimen analyzer 500 is improved. In addition, by inhibiting the liquid stored in a liquid storage portion 110 from being mixed into the liquid stored in another liquid storage portion 110, it is no longer necessary to take into consideration compatibility between liquids to be stored in the liquid storage portions 110. Thus, the degree of freedom in selecting liquids to be put in the liquid storage portions 110, and accordingly, a combination of reagents that corresponds to various test items can be stored in the liquid storage portions 110. Since reagents in various combinations can be stored in the liquid storage portions 110, the type of the cartridge can be diversified.

At least some of the liquid storage portions 110 may have a liquid holding part connected through an opening and a surface region connected to the passage 116. That is, the liquid storage portion 110 may have a liquid holding portion 211 in a recessed shape that has a passage-side opening 211a and that can hold a liquid therein. In the present embodiment, the R2 reagent chamber 111, the washing chambers 113, the R3 reagent chamber 114, and the R4 reagent chamber 151c each have the liquid holding portion 211. As shown in FIG. 20, steps 216 are provided around the opening 211a. The liquid stored in the liquid storage portion 110 may be present not only in the liquid holding portion 211 but also in the passage 116 above the liquid storage portion 110. The opening 211a is one example of the opening 11 shown in FIG. 1.

Figure 20:
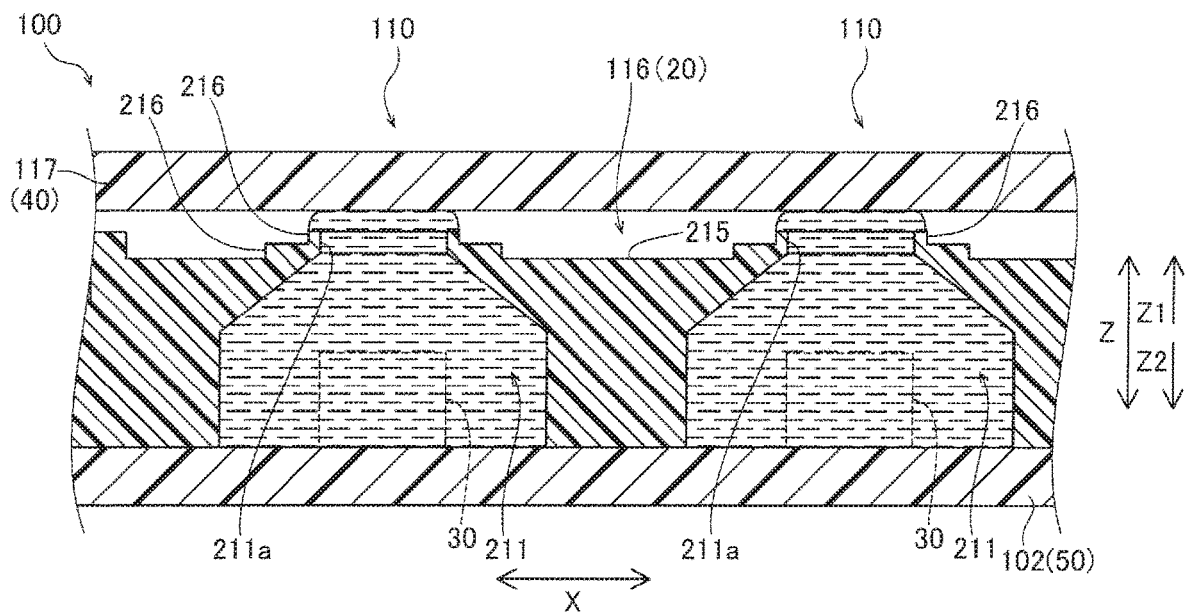
FIG. 20 is a diagram showing the liquid storage portions adjacent to each other.
Figure 21:
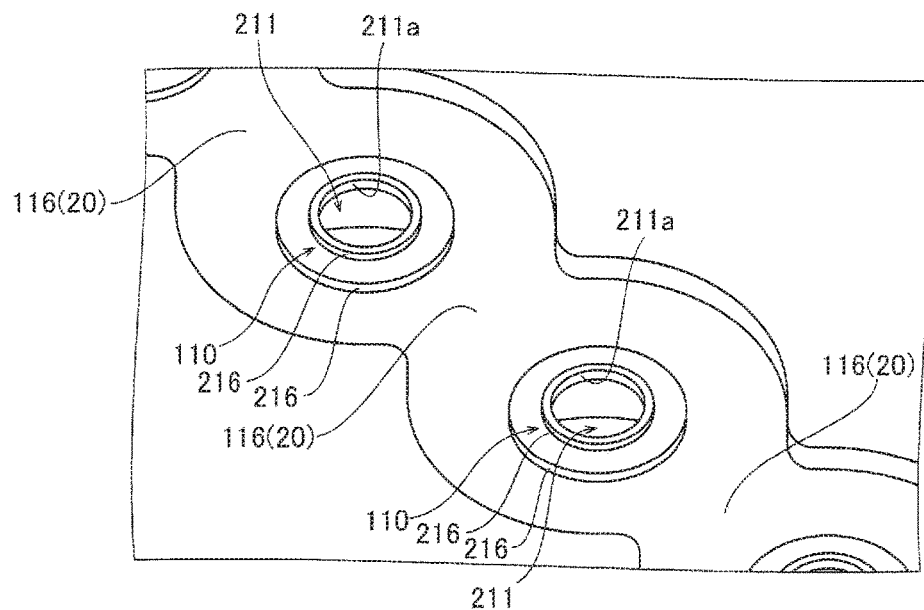
FIG. 21 is a perspective view of the liquid storage portions adjacent to each other, viewed from above.

As shown in FIG. 20 and FIG. 21, in the vicinity of the opening 211a, the step 216 can be provided. The step 216 is one example of the step 15 shown in FIG. 2. For example, the step 216 is disposed so as to provide a partition between one liquid storage portion 110 and another liquid storage portion 110 adjacent to the one liquid storage portion 110. The step 216 is disposed so as to provide a partition between the liquid storage portion 110 and the passage 116.

In the present embodiment, the liquid in a liquid storage portion 110 and the liquid in another liquid storage portion 110 can be inhibited from moving between the chambers and from being mixed with each other through the gas phase space in the passage 116. As a result, contamination between the liquid storage portions can be inhibited.

The step 216 is provided at an end portion of the liquid storage portion 110, for example. In addition, the step 216 is provided along the periphery of the opening 211a, for example. In a case where the opening 211a is circular, the step 216 may be provided in an annular shape that surrounds the outer periphery of the opening 211a.

For example, the cartridge 100 has a cover portion 117 that covers the liquid storage portions 110 and the passage 116. A liquid may be interposed between the liquid storage portions 110 and the cover portion 117. The cover portion 117 is in contact with the upper face of the liquid in the passage 116 above each liquid storage portion 110. The cover portion 117 is shown as one example of the elastic body 40 shown in FIG. 1.

In the configuration example shown in FIG. 20, the cover portion 117 covers each passage 116 from the upper face side.

The cover portion 117 is composed of a flat sheet-like member, for example. The surface at the liquid storage portion 110 side of the cover portion 117 may be formed from a hydrophobic material. The hydrophobic material may be a coating material provided at a surface of the sheet-like member of the cover portion 117. The sheet-like member forming the cover portion 117 may be formed from a hydrophobic material. The cartridge body 100a may be formed such that the surface at the Z1 side of the cartridge body 100a is hydrophobic, or may have a hydrophobic coating on the surface.

The cartridge 100 is covered by a sheet 102 at the Z2 side. The sheet 102 is shown as one example of the sheet 50 in FIG. 2.

As shown in FIG. 21, the step 216 is provided in the vicinity of the passage-side opening 211a of the liquid storage portion 110. The step 216 is provided along the outer shape of the passage-side opening 211a, for example. The step 216 is formed between the passage-side opening 211a and a surrounding portion of the passage-side opening 211a.

Figure 22:
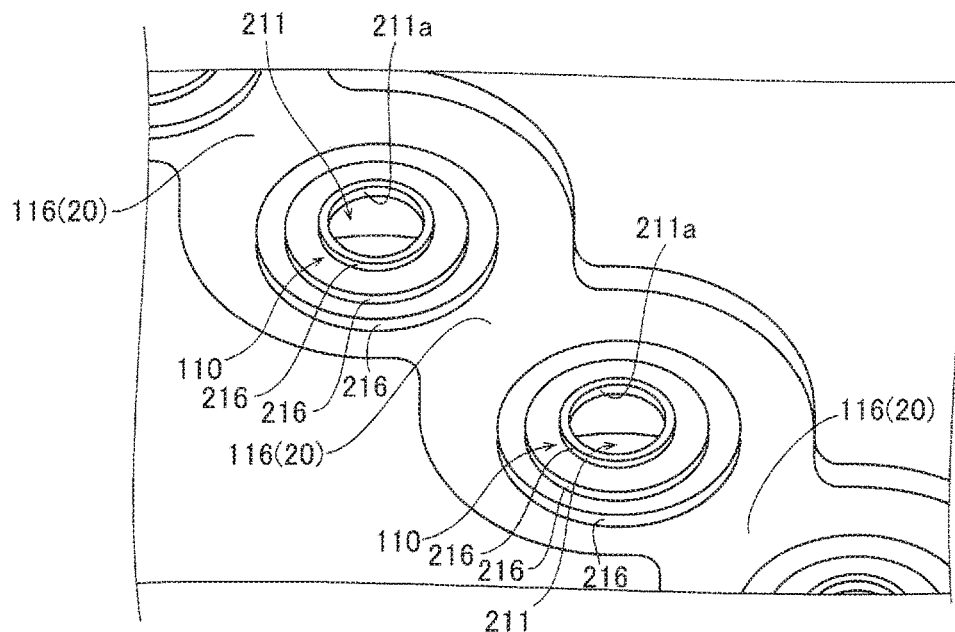
FIG. 22 is a perspective view of the liquid storage portions according to another configuration example, viewed from above.

In FIG. 21, an example in which two steps 216 are provided is shown. However, the number of the steps 216 can be changed as appropriate. For example, as shown in FIG. 22, three steps 216 may be provided.

(Other Configuration Examples of Liquid Storage Portion)

FIG. 23 is a configuration example showing a liquid storage portion 110 that can manage a plurality of liquid amounts.

Figure 23A:
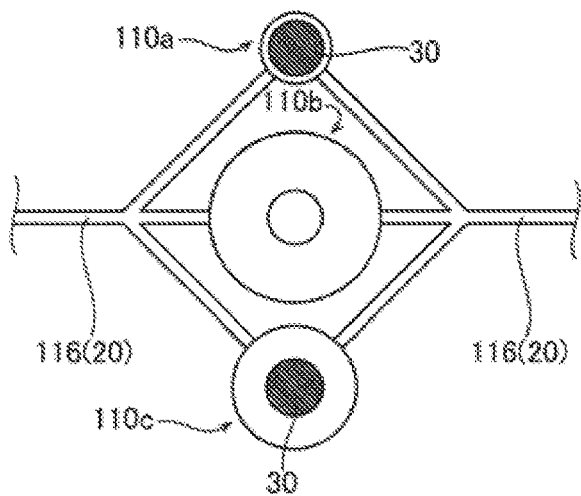
FIGS. 23A-23B are diagrams each showing the liquid storage portion that can manage a plurality of liquid amounts.

In the example shown in FIG. 23A, three liquid storage portions 110 (110a to 110c) having different volumes for storing the R3 reagent are provided. The passage 116 is branched into three at the portion where the passage 116 is connected to the three liquid storage portions 110a to 110c. The three liquid storage portions 110a to 110c are arranged in parallel with respect to the portion, of the passage 116, that is not branched. Although the necessary amount of the R3 reagent varies depending on the test subject, this configuration allows the R3 reagent to be stored in the liquid storage portion 110 that corresponds to the necessary reagent amount. As a result, there is no need to produce the cartridge 100 for each necessary amount of the R3 reagent. In a case where the seal bodies 30 are formed integrally with the cartridge 100, measurement is performed in a state where the seal of the liquid storage portion 110 not storing the R3 reagent is not opened. In a case where the seal bodies 30 are formed separately from the cartridge 100, the liquid storage portion 110 not storing the R3 reagent is not necessarily provided with the seal body 30.

Figure 23B:
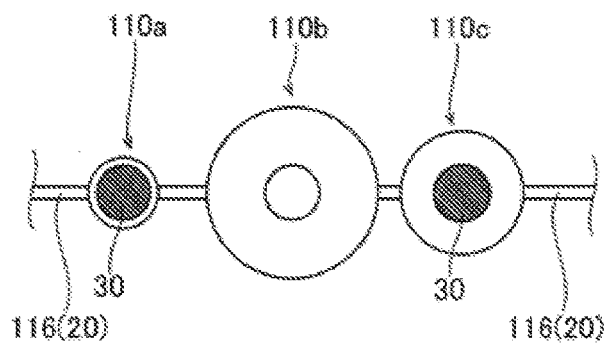

In the example shown in FIG. 23B, the three liquid storage portions 110a to 110c are arranged in series with respect to the passage 116. Also in the example shown in FIG. 23B, an effect similar to that in the case of FIG. 23A is obtained.

Figure 24:
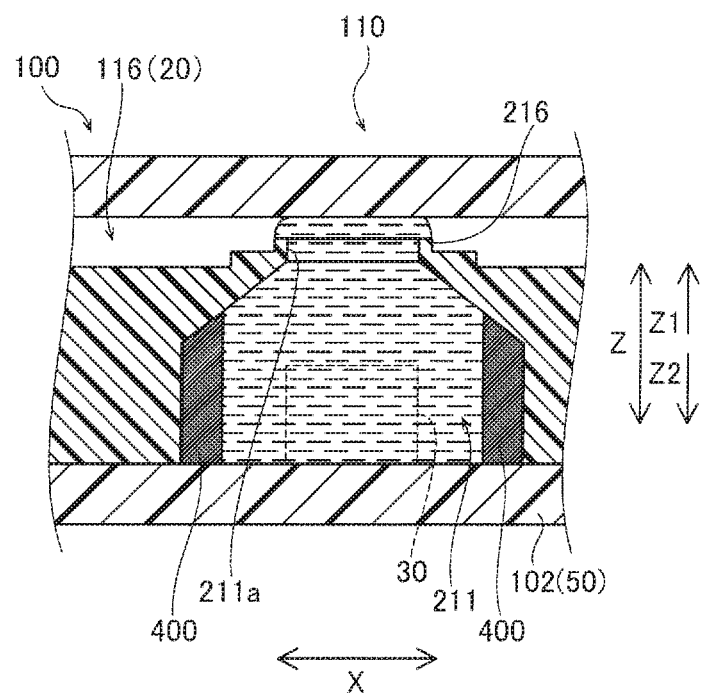
FIG. 24 is a diagram showing the liquid storage portion the volume of which is changed.

FIG. 24 is a configuration example of a liquid storage portion 110 the volume of which is changed by providing a volume adjustment member 400 at the inner face of the liquid storage portion 110. The volume adjustment member 400 can be formed by a resin ring, for example. The volume adjustment member 400 is formed such that the volume of the liquid storage portion 110 suits the reagent amount. In a case where the volume adjustment member 400 is formed by a resin ring, the volume adjustment member 400 is pressed into the liquid storage portion 110. With this configuration, even in a case where the volume of the liquid storage portion 110 is larger than the necessary reagent amount, the volume of the liquid storage portion 110 can be reduced, and the liquid can be pushed out to the passage 116 side at the time of the test.

(Specimen-R1 Reaction Chamber)

Figure 25A:
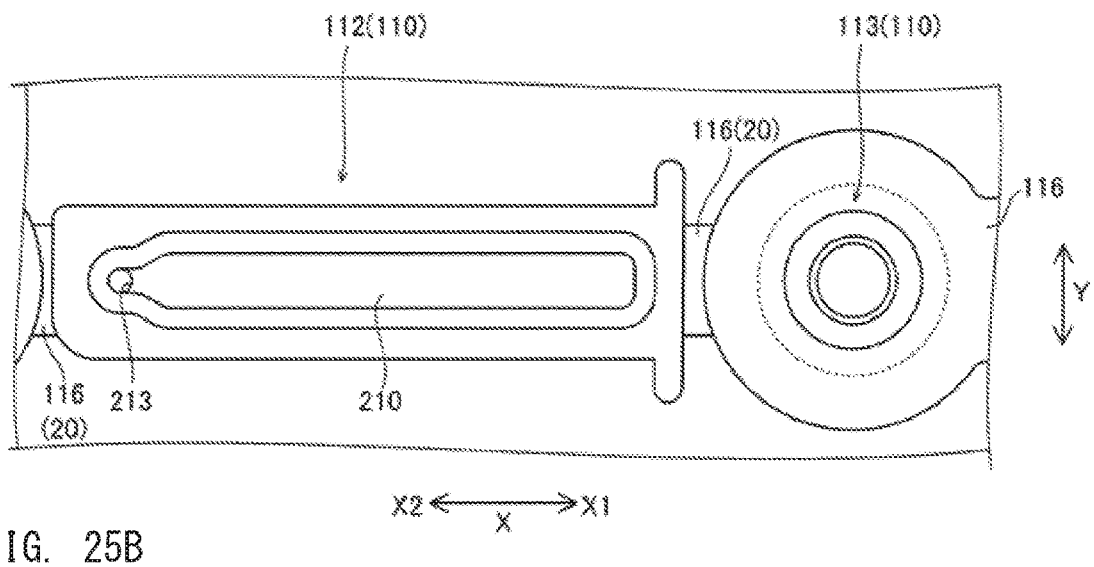
FIGS. 25A-25B are diagrams each showing a specimen-R1 reaction chamber.
Figure 25B:
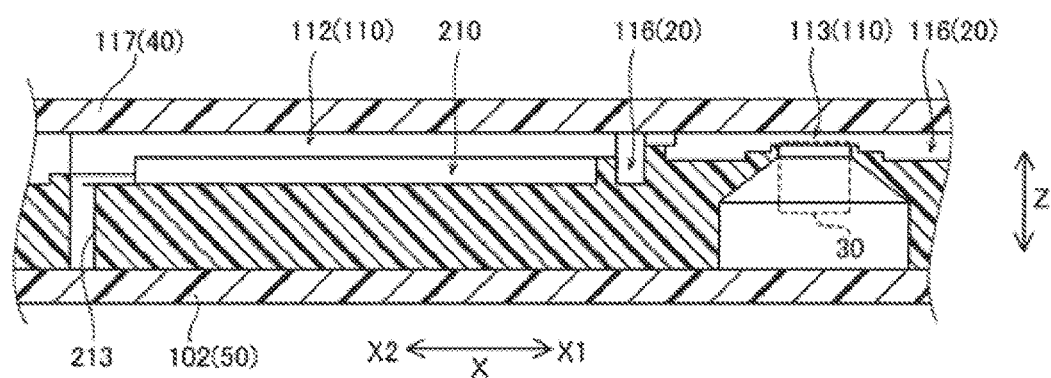

FIG. 25 shows a configuration example of the specimen-R1 reaction chamber 112. In the cartridge 100, a sample having been flowed from the blood cell separation portion 120 and the R1 reagent are mixed together on the flow path, and the resultant mixture is sent to the specimen-R1 reaction chamber 112.

The specimen-R1 reaction chamber 112 has a flow-in hole 213 for supplying the mixture of the sample and the R1 reagent into the chamber, for example. The flow-in hole 213 is disposed at an outer peripheral portion of a liquid placement position 210, for example. In FIG. 25, a configuration example is shown in which the liquid placement position 210 linearly extends in the X direction. In this case, the flow-in hole 213 is disposed at an end portion of the liquid placement position 210. The flow-in hole 213 is an opening formed in a surface (bottom face) of the liquid placement position 210, for example. Herein, the "longitudinal direction of the cartridge 100" is referred to as X direction. In addition, herein, the "short direction of the cartridge 100" is referred to as Y direction.

Figure 26:
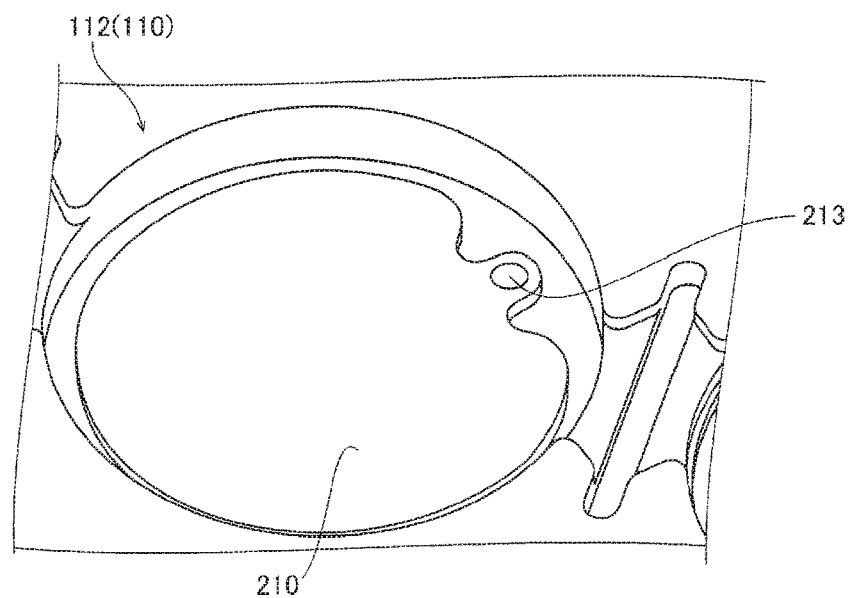
FIG. 26 is a diagram showing another configuration example of the specimen-R1 reaction chamber.

FIG. 26 shows another configuration example of the specimen-R1 reaction chamber 112.

The specimen-R1 reaction chamber 112 may have a shape other than a shape that linearly extends. Here, the specimen-R1 reaction chamber 112 has the liquid placement position 210 in a substantially circular shape. The flow-in hole 213 is disposed at the surface of an outer peripheral portion of the liquid placement position 210.

(Washing Chamber)

Figure 27A:
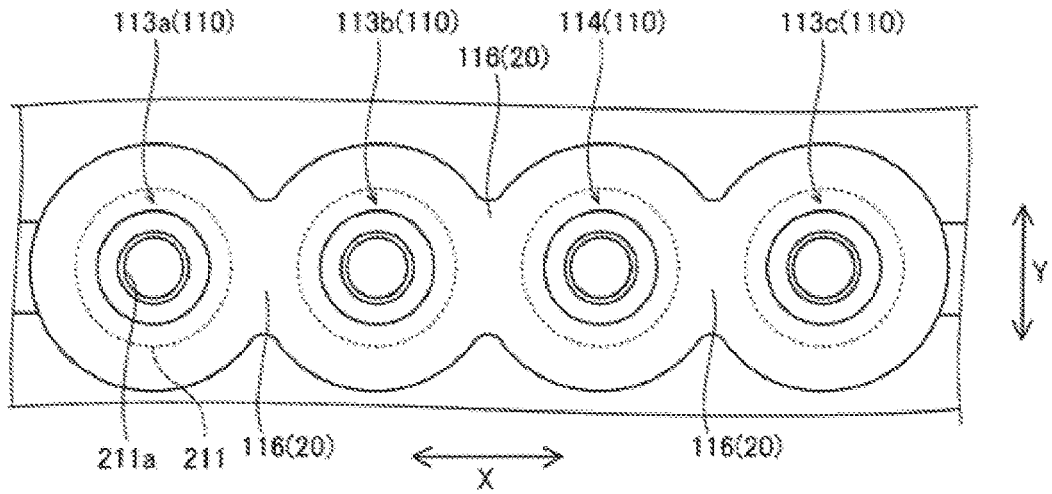
FIGS. 27A-27B are diagrams each showing washing chambers and a reagent chamber.
Figure 27B:
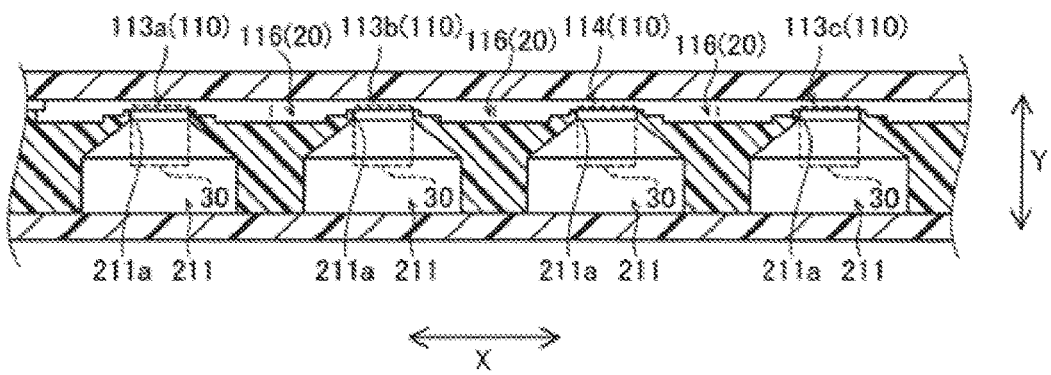

As shown in FIG. 27, the washing chamber 113 is disposed between reagent chambers in each of which a reagent and the magnetic particles 191 transferred by the magnetic force are caused to react. With this arrangement of the washing chambers 113, the magnetic particles 191 are washed in a washing chamber 113, and then transferred to the next reagent chamber. Thus, carryover of unreacted substances to the next reagent chamber can be inhibited. Between reagent chambers, a plurality of the washing chambers 113 may be disposed. For example, a washing chamber 113a and a washing chamber 113b are present between the specimen-R1 reaction chamber 112 and the R3 reagent chamber 114, and a washing chamber 113c is present between the R3 reagent chamber 114 and the R4 reagent chamber 151c.

The washing chamber 113a to the washing chamber 113c may be configured to include the liquid holding portion 211 having the passage-side opening 211a.

(R3 Reagent Chamber)

For example, for the R3 reagent chamber 114, a configuration similar to that of the washing chamber 113a to the washing chamber 113c can be employed.

(Transfer of Magnetic Particle)

In the present embodiment, the specimen analyzer 500 causes the magnetic particles 191 to be transferred between the liquids in the liquid storage portions 110. During the transfer of the magnetic particles 191, the antibody, the antigen, and the like contained in the liquids attach to the magnetic particles 191, whereby reaction necessary for the assay advances. The reaction necessary for the assay advances without the liquids being transferred. Thus, mixing of the liquid stored in a liquid storage portion 110 into the liquid stored in another liquid storage portion 110 due to the movement of the magnetic particles 191 is inhibited.

Figure 28:
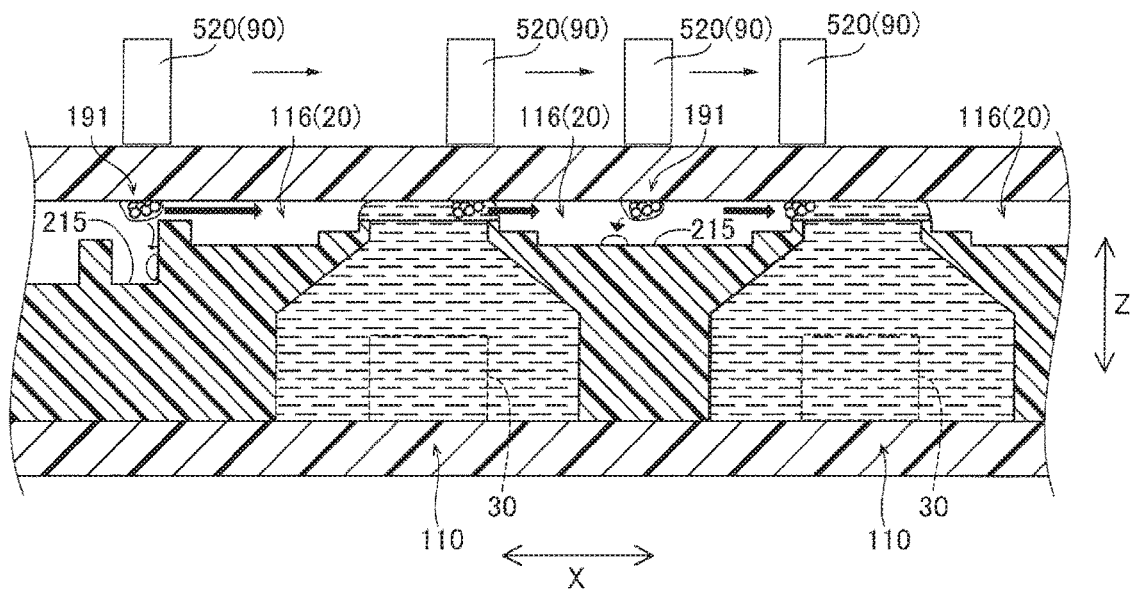
FIG. 28 is a diagram showing a structure for removing a liquid attached to magnetic particles.
Figure 29:
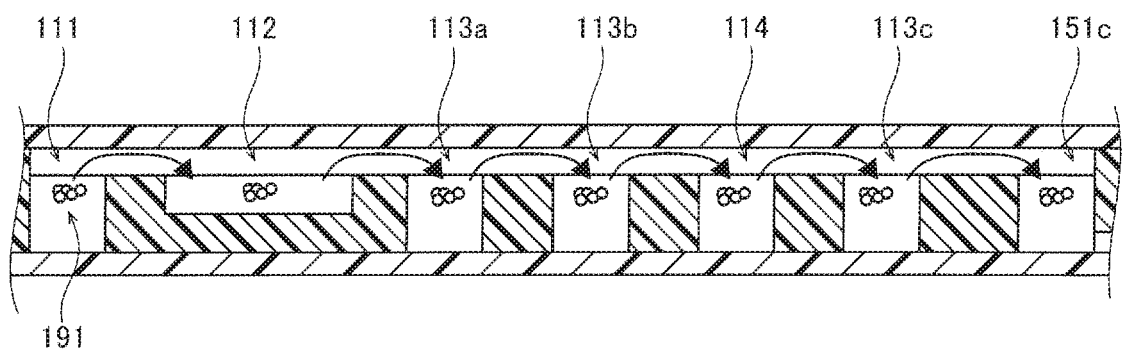
FIG. 29 is a diagram showing a state of magnetic particles transferred by magnetic force.

FIG. 28 shows the outline of the transfer of the magnetic particles 191. The specimen analyzer 500 causes the magnet 520 to approach a liquid storage portion 110 of the cartridge 100, to cause the magnetic particles 191 to aggregate at the liquid placement position 210 on the surface of the liquid storage portion 110. The specimen analyzer 500 causes the magnet 520 to move, thereby transferring the aggregated magnetic particles 191. The specimen analyzer 500 causes the magnet 520 to move, thereby transferring the aggregated magnetic particles 191 from the gas-liquid interface to the gas phase space of the passage 116. By the magnetic force of the magnet 520, the aggregated magnetic particles 191 are transferred from the gas-liquid interface of the liquid to the gas phase space of the passage 116. The specimen analyzer 500 further causes the magnet 520 to move, thereby transferring the aggregated magnetic particles 191 to another liquid placement position 210.

A plurality of the liquid storage portions 110 involved in transfer of the magnetic particles 191 are disposed linearly with respect to the longitudinal direction of the cartridge 100. Since the liquid storage portions 110 are disposed linearly, the magnetic particles 191 can be inhibited from remaining in the liquid storage portions 110 and the passage 116.

There are cases where the magnetic particles 191 having been transferred from the gas-liquid interface to the passage 116 have liquid attached thereto. As shown in FIG. 28, the plurality of the liquid storage portions 110 of the specimen analysis cartridge 100 may have a structure for further inhibiting the liquid stored in a liquid storage portion 110 from being mixed into the liquid stored in another liquid storage portion 110 due to the movement of the magnetic particles 191. For example, a groove 215 having a recessed surface may be provided in the passage 116, whereby a structure may be realized in which the liquid attached to the magnetic particles 191 easily falls from the passage 116 to the bottom face of the groove 215. In the groove 215, the liquid from the liquid storage portion 110 may be present.

The liquid in the liquid storage portion 110 may leak to the passage 116 through the opening 211a as long as the amount of the liquid leaking to the passage 116 does not allow the liquid to be mixed with the liquid in another liquid storage portion 110, and as long as a gas phase space remains in the passage 116. In this case, even if the liquid leaks to the passage 116, the magnetic particles 191 are transferred to the adjacent liquid storage portion 110 through the gas phase space of the passage 116. Thus, mixing of the liquid stored in a liquid storage portion 110 into the liquid stored in another liquid storage portion 110 due to the movement of the magnetic particles 191 can be inhibited. In a case where a structure is provided for further inhibiting the liquid stored in a liquid storage portion 110 from being mixed into the liquid stored in another liquid storage portion 110 due to the movement of the magnetic particles 191, mixing of the liquid stored in a liquid storage portion 110 into the liquid stored in another liquid storage portion 110 due to the movement of the magnetic particles 191 can be further inhibited. For example, in a case where a recessed-shaped groove is provided in the passage 116, even if the liquid stored in a liquid storage portion 110 and the liquid stored in another liquid storage portion 110 are mixed together in this groove, the magnetic particles 191 are transferred to the adjacent liquid storage portion 110 through the gas phase space of the passage 116. Thus, mixing of the liquid stored in a liquid storage portion 110 into the liquid stored in another liquid storage portion 110 due to the movement of the magnetic particles 191 can be further inhibited.

<Transfer of Magnetic Particle to Each Liquid Storage Portion>

Here, transfer of the magnetic particles 191 between two liquid storage portions is described. In the configuration example shown in FIG. 29, the magnetic particles 191 are transferred by the magnetic force, from the R2 reagent chamber 111 at the upstream side in the transfer direction, through the specimen-R1 reaction chamber 112, the washing chamber 113a, the washing chamber 113b, the R3 reagent chamber 114, and the washing chamber 113c, and then to the R4 reagent chamber 151c, in this order.

The magnetic particles 191 transferred by the magnetic force from the R2 reagent chamber 111 are mixed with the specimen 190 and the capture substance 192 of the R1 reagent, in the specimen-R1 reaction chamber 112. In the specimen-R1 reaction chamber 112, a reaction liquid containing the specimen 190, the magnetic particles 191, and the capture substance 192 is held.

The liquid held in the specimen-R1 reaction chamber 112 is a reaction liquid that contains the specimen 190, the magnetic particles 191, and the capture substance 192. The liquid held in the washing chamber 113a is a washing liquid. The magnetic particles 191 supporting the specimen 190 are transferred by means of the magnet 520 into the washing liquid in the washing chamber 113a.

The washing chamber 113b holds a washing liquid. Between the washing chamber 113a and the washing chamber 113b, only the magnetic particles 191 supporting the specimen 190 are transferred by the magnetic force, and thus, the washing liquid in the washing chamber 113a can be inhibited from being carried into the washing chamber 113b. Accordingly, unnecessary substances dispersed in the washing liquid at the washing chamber 113a can be inhibited from being transferred to the washing chamber 113b. Thus, the washing process can be effectively performed. As a result, the number of washing processes (i.e., the number of washing chambers) can be reduced. The unnecessary substances are components other than the specimen 190 contained in the sample, components in the reagents that have not reacted with the specimen 190, and the like.

The R3 reagent chamber 114 is a labeling reagent containing the labeling substance 193. The magnetic particles 191 supporting the specimen 190 are transferred from the washing chamber 113b to the R3 reagent chamber 114. Then, the specimen 190 reacts with the labeling substance 193.

The washing chamber 113c holds a washing liquid. In the washing chamber 113c, the magnetic particles 191 supporting the specimen 190 are washed. Also between the R3 reagent chamber 114 and the washing chamber 113c, the liquid can be inhibited from being carried from the R3 reagent chamber 114 to the washing chamber 113c. Accordingly, carrying over of unnecessary substances is reduced, whereby the washing process can be effectively performed. As a result, unnecessary substances are inhibited from being transferred to the detection chamber 170, and thus, lowering of the detection accuracy can be effectively inhibited.

The R4 reagent chamber 151c holds a buffer solution. The magnetic particles 191 transferred from the washing chamber 113c to the R4 reagent chamber 151c are dispersed in the buffer solution at the R4 reagent chamber 151c.

(Agitation Operation)

Figure 30:
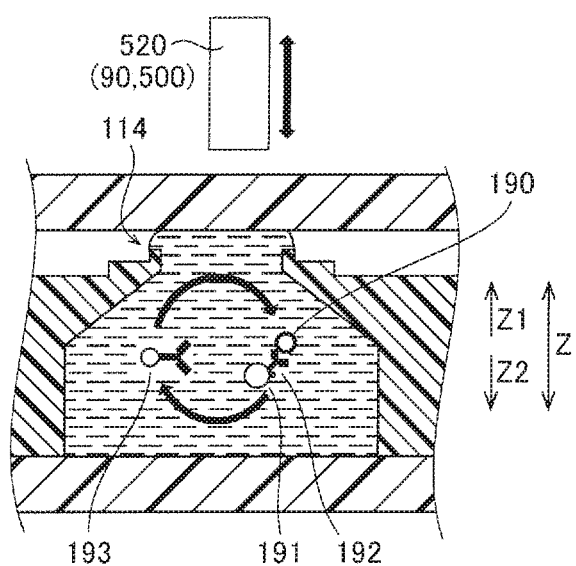
FIG. 30 is a diagram showing agitation operation performed by a magnet.

FIG. 30 shows an example of agitation operation performed in the R3 reagent chamber 114. The specimen analyzer 500 causes the magnet 520 to move along the Z direction in the R3 reagent chamber 114. As a result of the magnet 520 being moved in the Z direction of the cartridge 100, the labeling substance 193, the specimen 190, the magnetic particles 191, and the capture substance 192 are agitated in the depth direction of the R3 reagent chamber 114. Accordingly, agitation is promoted in the entirety of the depth direction of the R3 reagent chamber 114, instead of being performed only at the surface of the R3 reagent chamber 114. Preferably, a slope is provided to the inner wall of the liquid storage portion 110 such that the magnetic particles 191 can be efficiently collected when, after the agitation, the magnetic particles 191 are collected again to an upper portion at the passage 20 side by the magnet 520. The slope can be formed such that the area in the horizontal cross section of the liquid storage portion 110 is reduced from the Z2 side toward the Z1 side, for example.

The liquid storage portion 110 such as the R3 reagent chamber 114 may have a shape (see FIG. 5 and FIG. 6) which is in asymmetry with respect to a vertical face passing the center of the liquid storage portion 110. Accordingly, even if the seal body 30 is present in the liquid storage portion 110, agitation can be efficiently performed by use of the wider region at one side of the liquid storage portion 110.

In the example in which all of the liquid in the liquid storage portion 10 is pushed out to the passage 20 (see FIG. 14), agitation can be performed in the liquid region that is shallow in the Z direction and that is wide in the horizontal direction. In this liquid region, the seal body 30 is not present. In this case, agitation may be performed by moving the magnet 520 along the X direction.

(Specimen-R1 Flow Path)

Figure 31:
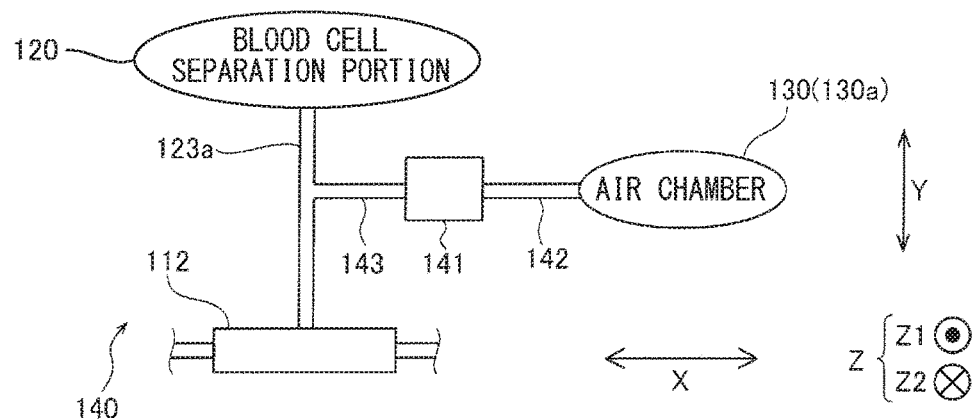
FIG. 31 is a plan view of a specimen-R1 flow path.

As shown in FIG. 31, the specimen-R1 flow path 140 includes the R1 reagent chamber 141, a first portion 142, and a second portion 143, for example.

The R1 reagent chamber 141 has one end thereof connected to the air chamber 130a through the first portion 142. The R1 reagent chamber 141 has the other end thereof connected to the specimen flow-in path 123a through the second portion 143. The second portion 143 merges with the specimen flow-in path 123a. The R1 reagent chamber 141 is provided in order to store the R1 reagent, for example.

Figure 32:
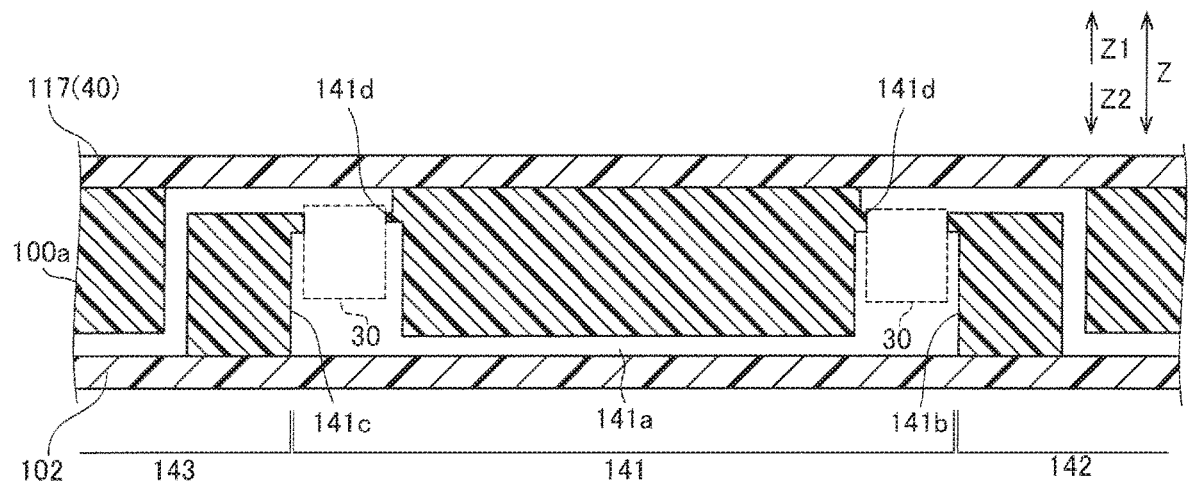
FIG. 32 is a cross-sectional view of the specimen-R1 flow path.

As shown in FIG. 32, with respect to the R1 reagent chamber 141, the reagent storage part 141a is formed, in the Z direction, in the vicinity of the bottom of the cartridge body 100a. One side of the R1 reagent chamber 141 is connected to the air chamber 130 (130a) through a portion 141b extending in the Z direction. The other side of the R1 reagent chamber 141 is connected to the second portion 143 through a portion 141c extending in the Z direction. The portion 141b includes the reduced-diameter portion 141d (seal body supporting portion) at the opposite side to the bottom of the cartridge body 100a. The portion 141c includes the reduced-diameter portion 141d at the opposite side to the bottom of the cartridge body 100a. In each of these portions 141d, the seal body is set.

The second portion 143 merged with the specimen flow-in path 123a is connected to the specimen-R1 reaction chamber 112, from the Z2 side of the cartridge 100, for example. Accordingly, the sample and the R1 reagent can be discharged from below to the specimen-R1 reaction chamber 112.

Figure 33:
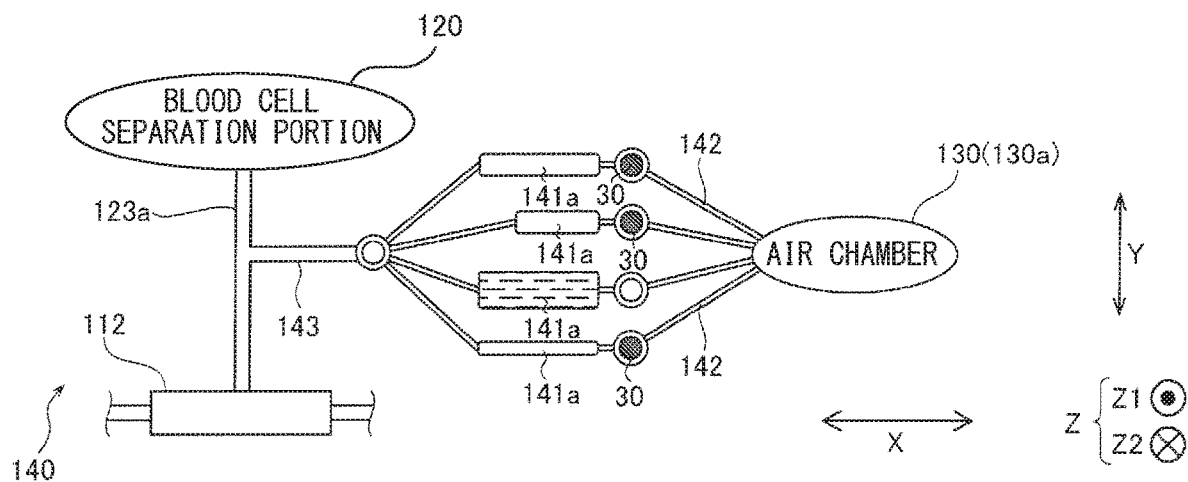
FIG. 33 is a diagram showing an R1 reagent chamber that can manage a plurality of liquid amounts.

As shown in FIG. 33, the reagent storage part 141a of the R1 reagent chamber 141 may be configured as the liquid storage portion 110 that can manage a plurality of liquid amounts shown in FIG. 23. In the example shown in FIG. 33, four reagent storage parts 141a having different volumes for storing the R1 reagent are provided. At upstream portions of the respective four reagent storage parts 141a, in a state where the seal is not yet opened, separate seal bodies 30 are disposed, respectively. At the downstream portion where the four reagent storage parts 141a merge with one another, in a state where the seal is not yet opened, a seal body 30 is disposed. It should be noted that, at downstream portions of the respective four reagent storage parts 141a, in a state where the seal is not yet opened, separate seal bodies 30 may be disposed, respectively.

(First Flow Path)

Figure 34:
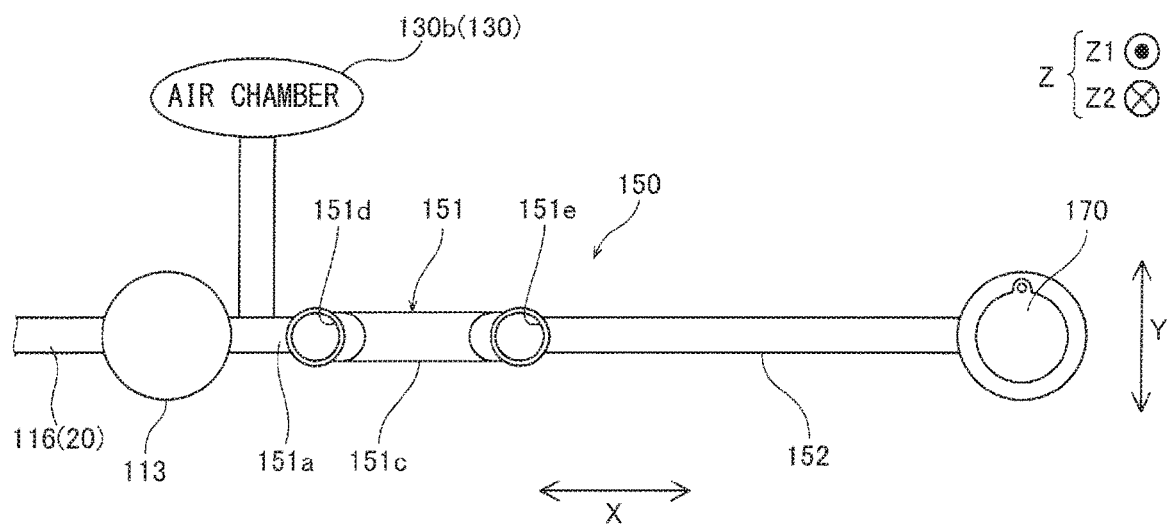
FIG. 34 is a plan view of a first flow path.

As shown in FIG. 34, a first flow path 150 is formed in a region between the passage 116 and the detection chamber 170. The first flow path 150 is provided so as to connect the passage 116 and the detection chamber 170 to each other. The first flow path 150 includes a dispersing portion 151 and a linear portion 152, for example. The first flow path 150 is provided so as to disperse, into the R4 reagent, the complex 190c formed in the R3 reagent chamber 114 and containing the specimen 190, the magnetic particles 191, and the labeling substance 193.

The mixture 190m is discharged from the first flow path 150 into the detection chamber 170 by the air pressure from the air chamber 130b.

Figure 35:
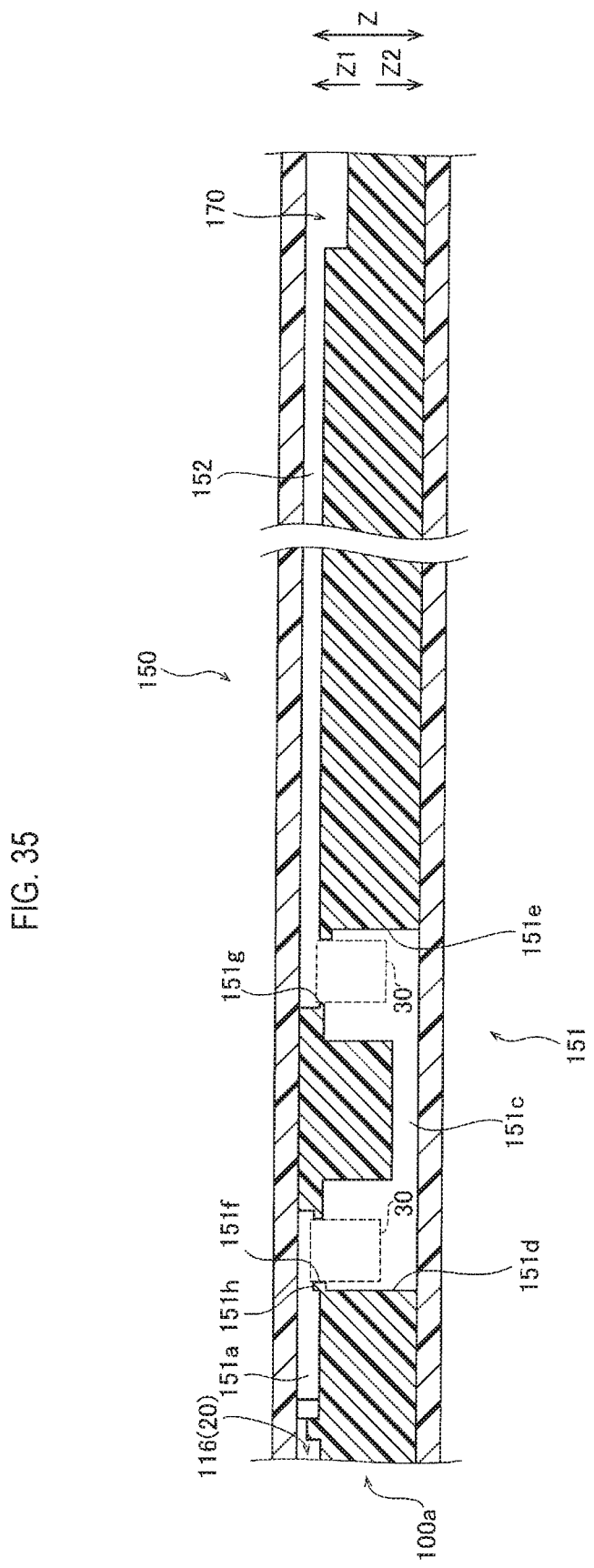
FIG. 35 is a cross-sectional view of the first flow path.

As shown in FIG. 35, the dispersing portion 151 includes a passage connection portion 151a connected to the passage 116. The passage connection portion 151a is the portion where the passage 116 and the first flow path 150 merge with each other. The dispersing portion 151 includes the R4 reagent chamber 151c. The R4 reagent chamber 151c is formed, in the Z direction, in the vicinity of the bottom of the cartridge body 100a. In the R4 reagent chamber 151c, a buffer solution as the R4 reagent is stored, for example. One side of the R4 reagent chamber 151c is connected to the passage connection portion 151a through a portion 151d extending in the Z direction. The other side of the R4 reagent chamber 151c is connected to the linear portion 152 through a portion 151e extending in the Z direction. In the portion 151d, the reduced-diameter portion 151f is formed at the opposite side to the bottom of the cartridge body 100a. In the portion 151e, the reduced-diameter portion 151g is formed at the opposite side to the bottom of the cartridge body 100a.

Above the reduced-diameter portion 151f, a step 151h is formed.

The linear portion 152 has one end thereof connected to the dispersing portion 151, and has the other end thereof connected to the detection chamber 170. The linear portion 152 is formed so as to extend in the X direction. Through the linear portion 152, the mixture 190m of the complex 190c and the R4 reagent can be discharged to the detection chamber 170.

(Second flow path)

Next, details of a second flow path 160 are described.

Figure 36:
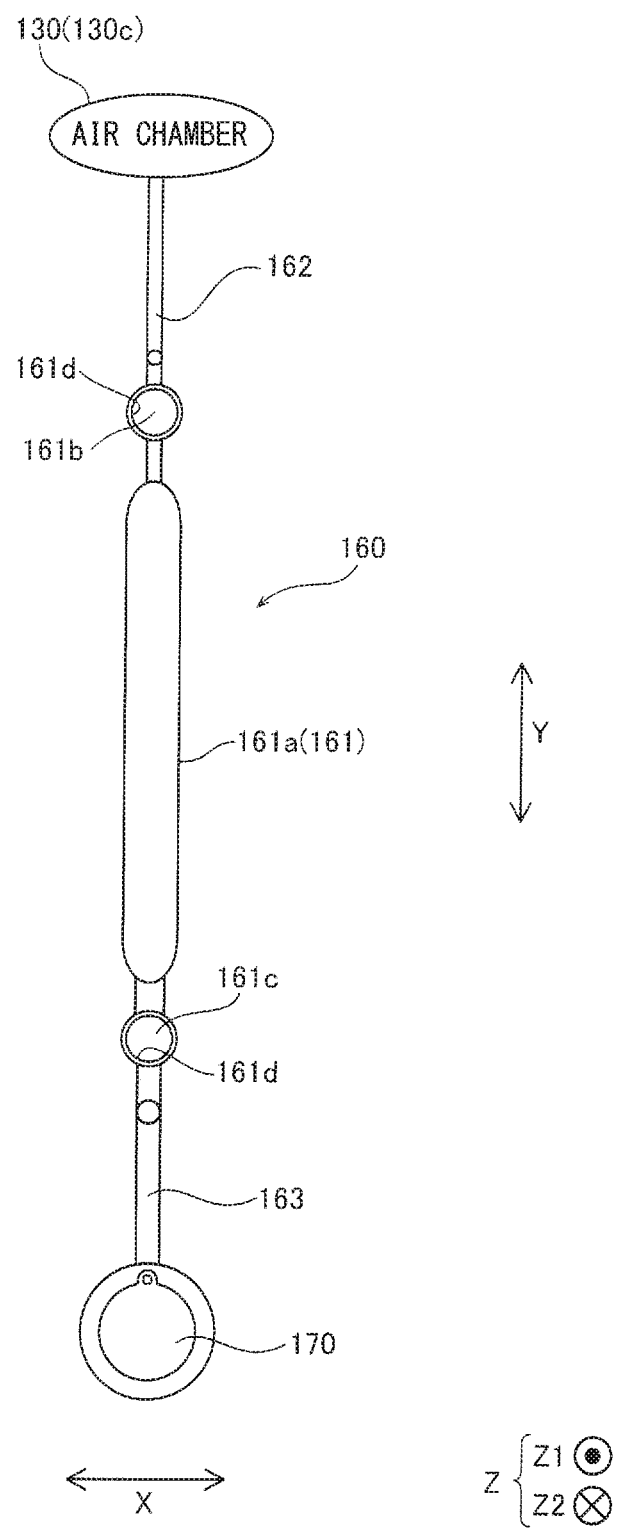
FIG. 36 is a plan view of an R5 reagent chamber.

As shown in FIG. 36, the second flow path 160 includes the R5 reagent chamber 161, a first portion 162, and a second portion 163, for example.

The R5 reagent chamber 161 has one end thereof connected to the air chamber 130c through the first portion 162. The R5 reagent chamber 161 has the other end thereof connected to the detection chamber 170 through the second portion 163. The R5 reagent chamber 161 is provided in order to store the R5 reagent, for example. The R5 reagent includes the substrate 194 that reacts with the complex 190c to prompt emission of light, for example.

The R5 reagent is discharged to the detection chamber 170 by the air pressure from the air chamber 130c.

The R5 reagent chamber 161 basically has the same configuration as that of the R1 reagent chamber 141 (see FIG. 32). With respect to the R5 reagent chamber 161, a reagent storage part 161a is formed, in the Z direction, in the vicinity of the bottom of the cartridge body 100a, for example. One side of the R5 reagent chamber 161 is connected to the first portion 162 through a portion 161b extending in the Z direction. The other side of the R5 reagent chamber 161 is connected to the second portion 163 through a portion 161c extending in the Z direction. In the portion 161b, the reduced-diameter portion 161d is formed at the opposite side to the bottom of the cartridge body 100a. In the portion 161c, the reduced-diameter portion 161d is formed at the opposite side to the bottom of the cartridge body 100a.

(Configuration of Detection Chamber)

The detection chamber 170 is provided in order to perform optical measurement on the mixture 190m to which the R5 reagent is added.

It should be noted that the embodiments disclosed herein are merely illustrative in all aspects and should not be considered as restrictive. The scope of the present invention is defined not by the description of the above embodiments but by the scope of the claims, and includes meaning equivalent to the scope of the claims and all changes within the scope.

What is claimed is:

1. A liquid-sealed cartridge comprising:
    a cartridge body including a plurality of liquid storage portions, wherein each liquid storage portion is provided with a first opening and a second opening;
    a first seal body configured to seal the first opening of each of the plurality of liquid storage portions and provided integrally with the cartridge body;
    a second seal body configured to seal the second opening of each of the plurality of liquid storage portions and provided integrally with the cartridge body; and
    an elastic body disposed so as to be distanced above and opposed to the plurality of liquid storage portions, wherein
    a passage is provided between the liquid storage portions and the elastic body, and
    each of the plurality of liquid storage portions and the passage are configured to be communicated with each other, by the corresponding seal bodies being pushed to be opened through the elastic body.

2. The liquid-sealed cartridge of claim 1, wherein
    each of the first seal body and the second seal body, in a sealed state, is opposed to a lower face of the elastic body forming the passage and is disposed at the opening.

3. The liquid-sealed cartridge of claim 2, wherein
    each of the first seal body and the second seal body includes: a thick portion; and a thin portion connecting an outer peripheral face of the thick portion and an inner peripheral face of the opening to each other.

4. The liquid-sealed cartridge of claim 3, wherein
    each of the first seal body and the second seal body is configured to be disposed in the liquid storage portion after the seal body is opened.

5. The liquid-sealed cartridge of claim 3, wherein
    the thin portion is formed such that a thickness thereof is gradually reduced.

6. The liquid-sealed cartridge of claim 3, wherein
    in the thin portion, a recess having a V-shape in cross section is formed.

7. The liquid-sealed cartridge of claim 1, wherein
    the cartridge body and each of the first seal body and the second seal body provided above the corresponding liquid storage portion are formed from an identical hard material.

8. The liquid-sealed cartridge of claim 1, wherein
    the passage includes a first passage and a second passage that are provided so as to be separated from each other,
    the first opening is configured to be communicated with the first passage by the first seal body being pushed to be opened through the elastic body, and
    the second opening is configured to be communicated with the second passage by the second seal body being pushed to be opened through the elastic body.

9. The liquid-sealed cartridge of claim 1, wherein
    each of the first seal body and the second seal body is in a shape of a spherical bead, a columnar rod, or a flat plate.

10. The liquid-sealed cartridge of claim 1, wherein
    the plurality of liquid storage portions each include at least one guide for positioning each of the first seal body and the second seal body having been opened.

11. The liquid-sealed cartridge of claim 10, wherein
    each of the first seal body and the second seal body is fixed in a state of being opened as a result of being pushed along the at least one guide.

12. The liquid-sealed cartridge of claim 10, wherein
    the at least one guide includes a holder configured to hold at least one of the first seal body and the second seal body having been opened.

13. The liquid-sealed cartridge of claim 12, wherein
    the at least one guide further includes an inclined portion configured to guide at least one of the first seal body and the second seal body to the holder.

14. The liquid-sealed cartridge of claim 12, wherein
    The at least one guide is composed of a plurality of guide members.

15. The liquid-sealed cartridge of claim 1, wherein
    the plurality of liquid storage portions each include an adhesive film disposed at an inner bottom face thereof, and
    each of the first seal body and the second seal body is pushed until coming into contact with the adhesive film, to be opened and fixed.

16. The liquid-sealed cartridge of claim 1, wherein
    the plurality of liquid storage portions each include, at a bottom face side thereof, an air region configured to push back a liquid to the liquid storage portion side.

17. The liquid-sealed cartridge of claim 16, wherein
    the air region is configured to be disposed in a vicinity of a heat block configured to heat the liquid-sealed cartridge.

18. The liquid-sealed cartridge of claim 1, wherein
the plurality of liquid storage portions each include, at a
  bottom face side thereof:
    a liquid-sending path configured to push out a liquid to
      the passage side; and
    a liquid-sending chamber communicated with the liquid-sending path.

19. A specimen analysis method comprising:
storing a specimen in a liquid-sealed cartridge,
  the liquid-sealed cartridge including a first seal body configured to seal a first opening of each of a plurality of liquid storage portions included in a cartridge body, a second seal body configured to seal a second opening of each of the plurality of liquid storage portions included in the cartridge body, the first seal body and the second seal body being provided integrally with the cartridge body, and an elastic body disposed so as to be distanced above and opposed to the plurality of liquid storage portions, wherein a passage is provided between the liquid storage portions and the elastic body; and
pushing and opening each of the first seal body and the second seal body through the elastic body in order to cause each of the plurality of liquid storage portions and the passage to be communicated with each other, and performing analysis of the specimen by use of liquid.

* * * * *